US012620350B2

(12) United States Patent
Kim et al.

(10) Patent No.: US 12,620,350 B2
(45) Date of Patent: May 5, 2026

(54) PIXEL CIRCUIT, DISPLAY APPARATUS INCLUDING THE PIXEL CIRCUIT, AND ELECTRONIC APPARATUS INCLUDING THE PIXEL CIRCUIT

(71) Applicants: Samsung Display Co., LTD., Yongin-si (KR); IUCF-HYU (Industry-University Cooperation Foundation Hanyang University), Seoul (KR)

(72) Inventors: Kwihyun Kim, Yongin-si (KR); Byong-Deok Choi, Seoul (KR); Sehyun Lee, Yongin-si (KR); Sunhwa Lee, Yongin-si (KR); June-Hee Lee, Seoul (KR); Kyunghoon Chung, Yongin-si (KR); Yong-Duck Kim, Seoul (KR)

(73) Assignees: SAMSUNG DISPLAY CO., LTD., Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 19/189,501

(22) Filed: Apr. 25, 2025

(65) Prior Publication Data

US 2025/0391334 A1 Dec. 25, 2025

(30) Foreign Application Priority Data

Jun. 20, 2024 (KR) ........................ 10-2024-0079989

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 2024/0249668 A1* | 7/2024 | Woo | ......................... | G09G 3/32 |
| 2025/0104627 A1* | 3/2025 | Kim | ..................... | G09G 3/3233 |
| 2025/0148968 A1* | 5/2025 | Lin | ......................... | G09G 3/32 |
| 2025/0209972 A1* | 6/2025 | Lin | ......................... | G09G 3/32 |

(Continued)

FOREIGN PATENT DOCUMENTS

| | | |
|---|---|---|
| KR | 1020200038735 A | 4/2020 |
| KR | 1020200052265 A | 5/2020 |
| KR | 1020220052265 A | 4/2022 |

*Primary Examiner* — Christopher J Kohlman
(74) *Attorney, Agent, or Firm* — CANTOR COLBURN LLP

(57) ABSTRACT

A pixel circuit includes a driving transistor which generates a driving current based on a data signal, a light emitting element which emits light based on the driving current, a pulse signal applying block which outputs an emission control signal based on a pulse data voltage and a timing signal and a push-pull transistor which applies an initialization voltage to a first electrode of the light emitting element in response to the emission control signal. The light emitting element may stop emitting based on the emission control signal.

20 Claims, 18 Drawing Sheets

(56) References Cited

U.S. PATENT DOCUMENTS

| | | | | |
|---|---|---|---|---|
| 2025/0336338 | A1* | 10/2025 | Kim | G09G 3/2081 |
| 2025/0336353 | A1* | 10/2025 | Lee | G09G 3/2014 |
| 2025/0342794 | A1* | 11/2025 | Kim | G09G 3/3233 |
| 2025/0342796 | A1* | 11/2025 | Kim | G09G 3/3233 |
| 2025/0378781 | A1* | 12/2025 | Lee | G09G 3/32 |

* cited by examiner

PIXEL CIRCUIT, DISPLAY APPARATUS INCLUDING THE PIXEL CIRCUIT, AND ELECTRONIC APPARATUS INCLUDING THE PIXEL CIRCUIT

This application claims priority to Korean Patent Application No. 10-2024-0079989, filed on Jun. 20, 2024, and all the benefits accruing therefrom under 35 U.S.C. § 119, the content of which in its entirety is herein incorporated by reference.

BACKGROUND

1. Field

Embodiments supported by aspects of the present disclosure relate to a pixel circuit, a display apparatus including the pixel circuit, and an electronic apparatus including the pixel circuit. More particularly, embodiments of the present disclosure relate to a pixel circuit in which an emission efficiency is improved, a display apparatus including the pixel circuit, and an electronic apparatus including the pixel circuit improving the display quality.

2. Description of the Related Art

Generally, a display apparatus includes a display panel and a display panel driver. The display panel includes a plurality of gate lines, a plurality of data lines, a plurality of emission lines, and a plurality of pixels. The display panel driver includes a gate driver providing a gate signal to the gate lines, a data driver providing a data voltage to the data lines, an emission driver providing an emission signal to the emission lines, and a driving controller controlling the gate driver, the data driver and the emission driver.

Generally, a light emitting element initialization signal applied to a pixel circuit may be sequentially applied to pixel-rows.

SUMMARY

Embodiments supported by aspects of the present disclosure provide a pixel circuit in which an accuracy of an emission time and an emission efficiency is improved.

Embodiments supported by aspects of the present disclosure also provide a display apparatus including the pixel circuit.

Embodiments supported by aspects of the present disclosure also provide an electronic apparatus including the pixel circuit.

According to embodiments, a pixel circuit may include a driving transistor which generates a driving current based on a data signal, a light emitting element which emits light based on the driving current, a pulse signal applying block which outputs an emission control signal based on a pulse data voltage and a timing signal and a push-pull transistor which applies an initialization voltage to a first electrode of the light emitting element in response to the emission control signal. The light emitting element may stop emitting based on the emission control signal.

In an embodiment, the push-pull transistor may include a control electrode receiving the emission control signal, a first electrode receiving the initialization voltage, and a second electrode connected to the first electrode of the light emitting element.

In an embodiment, the pixel circuit may further include an emission control transistor which applies the initialization voltage to a control electrode of the driving transistor.

In an embodiment, an absolute value of a threshold voltage of the push-pull transistor may be equal to an absolute value of a threshold voltage of the emission control transistor.

In an embodiment, the pixel circuit may further include an emission transistor which outputs the driving current to the first electrode of the light emitting element.

In an embodiment, an absolute value of a threshold voltage of the push-pull transistor may be equal to an absolute value of a threshold voltage of the emission transistor.

In an embodiment, the pulse signal applying block may include a pulse writing transistor which applies the pulse data voltage to a pulse control node in response to a write gate signal and an inverting block which outputs the emission control signal based on a voltage of the pulse control node.

In an embodiment, the inverting block may include a first inverter transistor including a control electrode connected to the pulse control node, a first electrode receiving a first power voltage, and a second electrode connected to an output node and a second inverter transistor including a control electrode connected to the pulse control node, a first electrode receiving a second power voltage, and a second electrode connected to the output node.

In an embodiment, the second power voltage may be applied to a second electrode of the light emitting element.

In an embodiment, the pixel circuit may further include an emission transistor including a control electrode connected to the output node, a first electrode connected to the driving transistor, and a second electrode connected to the light emitting element. The push-pull transistor may include a control electrode connected to the output node, a first electrode receiving the initialization voltage, and a second electrode connected to the first electrode of the light emitting element. The emission transistor may be a P-type transistor, and the push-pull transistor may be an N-type transistor.

In an embodiment, the driving transistor may include a control electrode connected to a first node, a first electrode connected to a second node, and a third electrode connected to a third node. The pixel circuit may include a writing transistor which applies a data voltage based on the data signal to the second node in response to a write gate signal, a compensation transistor which connects the first node and the third node in response to the write gate signal, an initialization transistor which applies the initialization voltage to the first node in response to a previous write gate signal and an emission transistor which connects the third node and a fourth node in response to the emission control signal. The first electrode of the light emitting element may be connected to the fourth node. The push-pull transistor may include a control electrode receiving the emission control signal, a first electrode receiving the initialization voltage, and a second electrode connected to the fourth node.

In an embodiment, the timing signal may be a sweep signal. A frame period in which the pixel circuit is driven may include a writing period and an emission period. In the writing period, the write gate signal may have an activation level, and the writing transistor may be turned on. In the emission period, the sweep signal may be gradually decreased from a high level to a low level.

In an embodiment, the emission transistor may be a P-type transistor, and the push-pull transistor may be an N-type transistor.

In an embodiment, the driving transistor may include a control electrode connected to a first node, a first electrode connected to a second node, and a second electrode connected to a third node. The pixel circuit may include a writing transistor which applies a data voltage based on the data signal to the second node in response to a write gate signal, a compensation transistor which connects the first node and the third node in response to the write gate signal, an initialization transistor which applies the initialization voltage to the first node in response to a previous write gate signal, a first emission transistor which applies a first power voltage to the second node in response to an emission signal, a second emission transistor which connects the third node and a fourth node in response to the emission signal and an emission control transistor which applies the first power voltage to the first node in response to the emission control signal. The first electrode of the light emitting element may be connected to the fourth node. The push-pull transistor may include a control electrode receiving the emission control signal, a first electrode receiving the initialization voltage, and a second electrode connected to the fourth node.

According to embodiments, a display apparatus may include a display panel including a pixel circuit, a gate driver which outputs a gate signal to the display panel, a data driver which applies a data voltage and a pulse data voltage to the display panel based on a data signal, a driving controller which outputs the data signal to the data driver and a sweep signal generator which outputs a timing signal to the display panel. The pixel circuit may include a driving transistor which generates a driving current based on the data signal, a light emitting element which emits light based on the driving current, a pulse signal applying block which outputs an emission control signal based on the pulse data voltage and the timing signal and a push-pull transistor which applies an initialization voltage to a first electrode of the light emitting element in response to the emission control signal. The light emitting element may stop emitting based on the emission control signal.

In an embodiment, the push-pull transistor may include a control electrode receiving the emission control signal, a first electrode receiving the initialization voltage, and a second electrode connected to the first electrode of the light emitting element.

In an embodiment, the pixel circuit may further include an emission control transistor which applies the initialization voltage to a control electrode of the driving transistor.

In an embodiment, an absolute value of a threshold voltage of the push-pull transistor may be equal to an absolute value of a threshold voltage of the emission control transistor.

In an embodiment, the pixel circuit may further include an emission transistor which outputs the driving current to the first electrode of the light emitting element.

In an embodiment, an absolute value of a threshold voltage of the push-pull transistor may be equal to an absolute value of a threshold voltage of the emission transistor.

According to embodiments, an electronic apparatus may include a display panel including a pixel circuit, a gate driver which outputs a gate signal to the display panel, a data driver which applies a data voltage and a pulse data voltage to the display panel based on a data signal, a driving controller which controls the gate driver and the data driver and outputs the data signal to the data driver, based on an input control signal, a processor which outputs the input control signal and a sweep signal generator which outputs a timing signal to the display panel. The pixel circuit may include a driving transistor which generates a driving current based on the data signal, a light emitting element which emits light based on the driving current, a pulse signal applying block which outputs an emission control signal based on the pulse data voltage and the timing signal and a push-pull transistor which applies an initialization voltage to a first electrode of the light emitting element in response to the emission control signal. The light emitting element stops emitting based on the emission control signal.

As described herein, an emission transistor is turned off in response to an emission control signal. In some aspects, a push-pull transistor is turned on in response to the emission control signal. Accordingly, a light emitting element initialization operation may be performed to each pixel circuit. For example, a timing in which each of the pixel circuits stops emitting may be synchronized to a timing in which a push-pull transistor is turned on. Accordingly, an emission characteristic may be improved.

In some aspects, a display apparatus may be implemented without a driver generating a light emitting element initialization gate signal. Accordingly, an integration of a display apparatus may be improved.

In some aspects, the pixel circuit may include the inverting block. The inverting block may output the emission control signal based on a pulse control node. For example, the emission control signal may have a logic high level or a logic low level. For example, even when the voltage of the sixth node is changed linearly, the emission control signal may have a logic high level or a logic low level. Accordingly, an emission transistor and the push-pull transistor may be effectively controlled.

In some aspects, an absolute value of threshold voltage of the emission transistor may be substantially the same as an absolute value of threshold voltage of the push-pull transistor. Accordingly, a timepoint in which the emission transistor is turned off may be substantially the same as a timepoint in which the push-pull transistor is turned on. Accordingly, an emission characteristic of the pixel circuit may be further improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
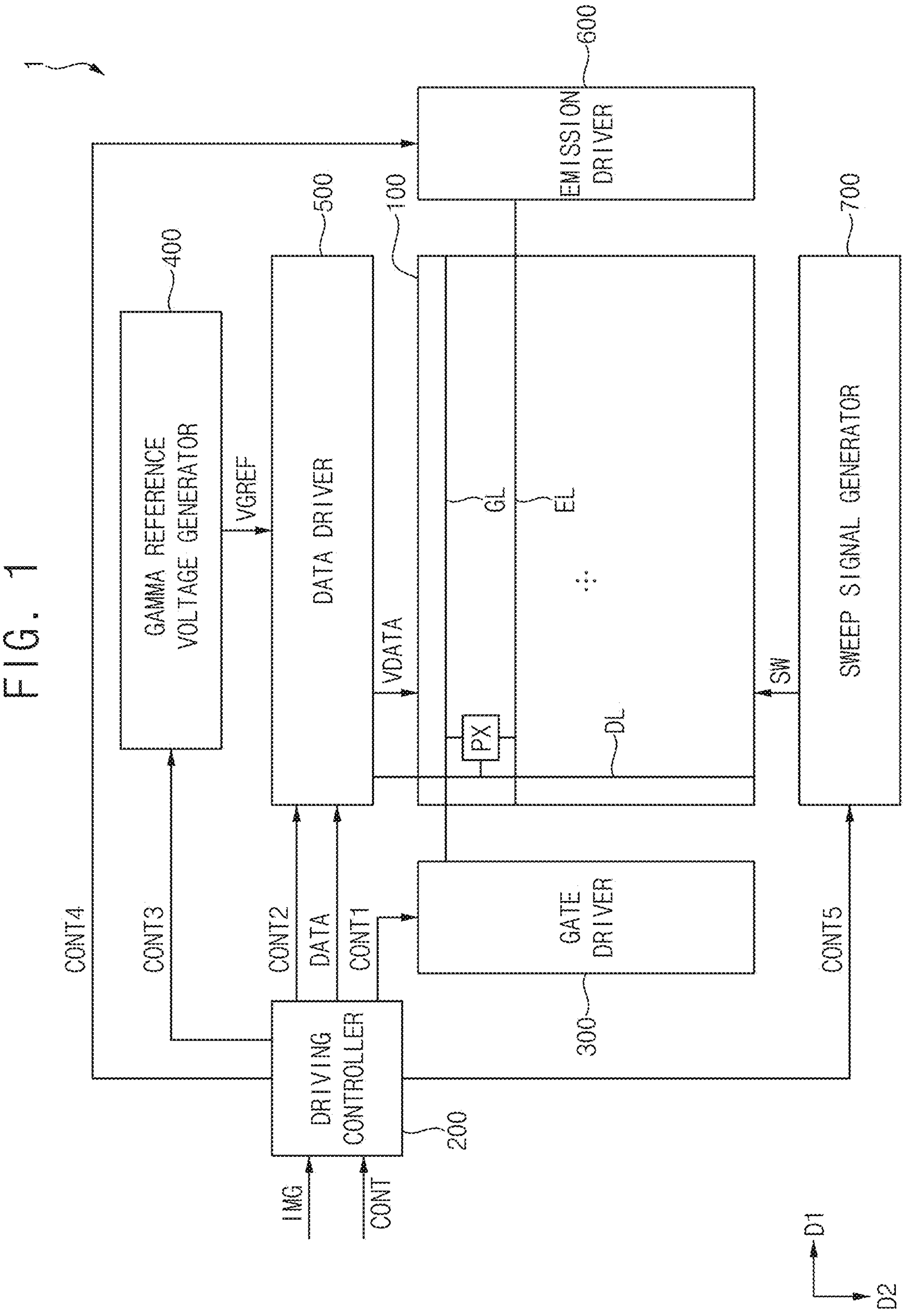
FIG. 1 is a block diagram illustrating a display apparatus according to embodiments of the present disclosure.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating a display apparatus 1 according to embodiments of the present disclosure.

Referring to FIG. 1, the display apparatus 1 may include a display panel 100 and a display panel driver. The display apparatus 1 may include a driving controller 200, a gate driver 300 (which may also be referred to as a gate emission driver), a gamma reference voltage generator 400, a data driver 500 and an emission driver 600. In an embodiment, the display apparatus 1 may further include a sweep signal generator 700 (which may also be referred to as a sweep signal generator driver).

The display panel 100 may have a display region on which an image is displayed and a peripheral region adjacent to the display region.

The display panel 100 may include a plurality of gate lines GL, plurality of emission lines EL, a plurality of data lines DL and a plurality of pixels PX electrically connected to the gate lines GL, the emission lines EL and the data lines DL. The gate lines GL may extend in a first direction D1, the emission lines EL may extend in the first direction D1 and the data lines DL may extend in a second direction D2 crossing the first direction D1.

The driving controller 200 may receive input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT. In an embodiment, the driving controller 200 may further generate a fifth control signal CONT5.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

In an embodiment, the driving controller 200 may generate the fifth control signal CONT5 for controlling an operation of the sweep signal generator 700 based on the input control signal CONT, and output the fifth control signal CONT5 to the sweep signal generator 700.

The gate driver 300 may generate gate signals driving the gate lines GL in response to the first control signal CONT1 received from the driving controller 200. The gate driver 300 may output the gate signals to the gate lines GL.

In an embodiment, the gate driver 300 may be disposed in the peripheral region. In an embodiment, the gate driver 300 may be integrated in the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL. In an embodiment, the data driver 500 may further output a pulse data voltage PWVDATA. In an embodiment, the data driver 500 may generate a data current based on the data signal DATA. In an embodiment, the data driver 500 may output the data current to the data lines DL.

In an embodiment, the data driver 500 may be disposed in the peripheral region. In an embodiment, the data driver 500 may be integrated in the peripheral region.

Figure 4:
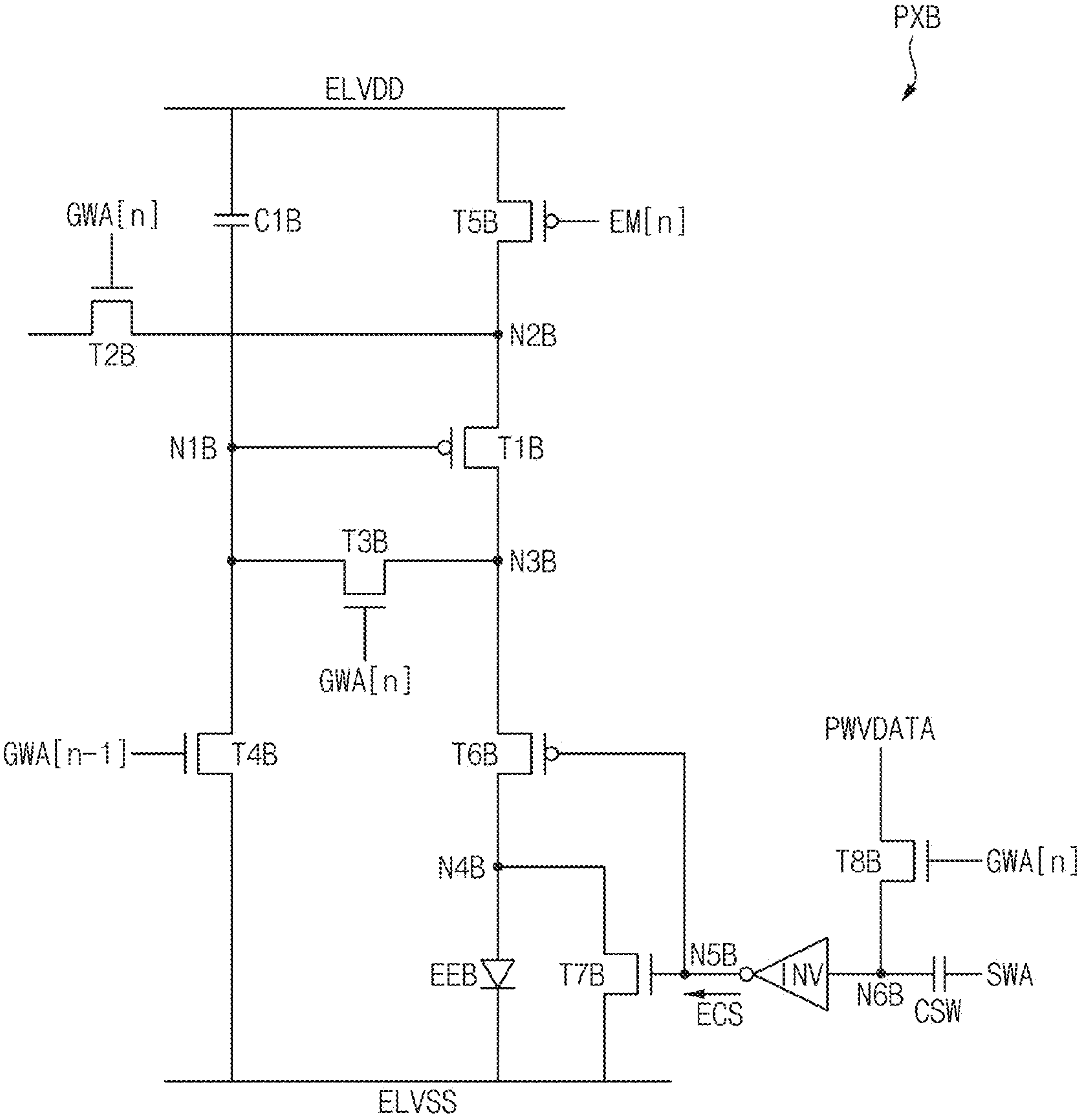
FIG. 4 is a circuit diagram illustrating an example of a pixel circuit included in a display panel of FIG. 1.

The emission driver 600 may generate emission signal EM of FIG. 4 in response to the fourth control signal CONT4 received from the driving controller 200. The emission driver 600 may output the emission signal to the display panel 100.

In an embodiment, the emission driver 600 may be disposed in the peripheral region. In an embodiment, the emission driver 600 may be integrated in the peripheral region.

Although the gate driver 300 is disposed on a first side of the display panel 100, and the emission driver 600 is disposed on a second side of the display panel 100 in FIG. 1 for convenience of explanation, embodiments of the present disclosure are not limited thereto. The gate driver 300 and the emission driver 600 may be disposed on the first side of the display panel 100. For example, the gate driver 300 and the emission driver 600 may be disposed on the peripheral region of the display panel 100 on the same side of the display region of the display panel 100. For example, the gate driver 300 and the emission driver 600 may be formed integrally with each other.

The sweep signal generator 700 may generate a timing signal in response to the fifth control signal CONT5 received from the driving controller 200. The timing signal may be a sweep signal SW. In an embodiment, the timing signal may be a stepwise signal. However, embodiments of the present disclosure are not limited to a type of the timing signal. The sweep signal generator 700 may output the timing signal to the display panel 100. For example, the sweep signal generator 700 may output the sweep signal SW to the display panel 100. For example, the sweep signal SW may be gradually decreased from a high level to a low level. For example, the sweep signal SW may be gradually increased from a low level to a high level.

Figure 2:
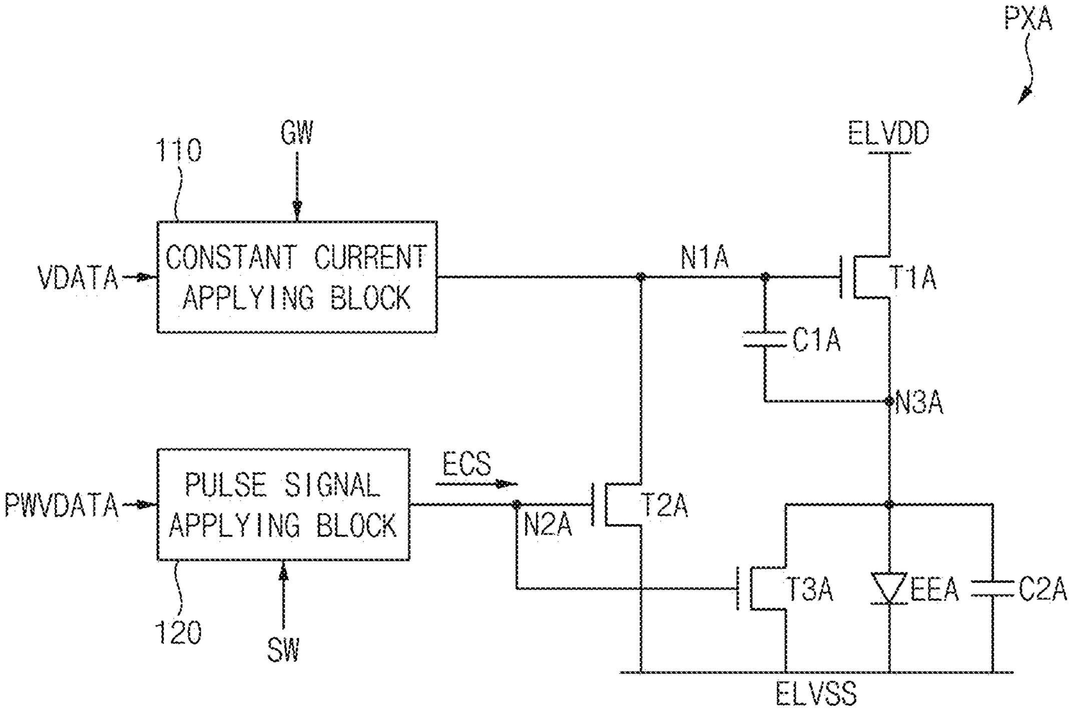
FIG. 2 is a circuit diagram illustrating an example of a pixel circuit included in a display panel of FIG. 1.
Figure 3:
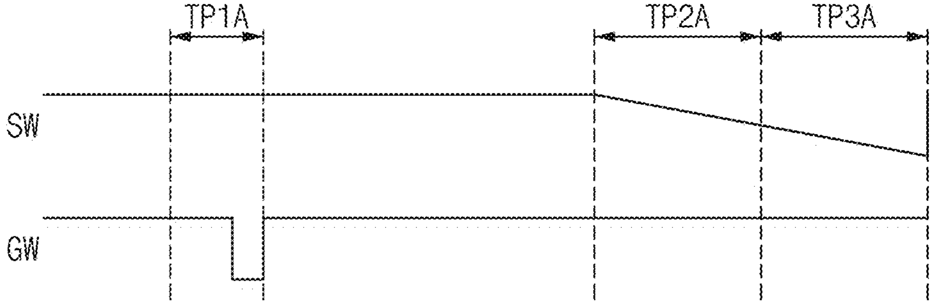
FIG. 3 is a timing diagram illustrating signals applied to a pixel circuit of FIG. 2.

FIG. 2 is a circuit diagram illustrating an example of a pixel circuit PX included in a display panel 100 of FIG. 1. FIG. 3 is a timing diagram illustrating signals applied to a pixel circuit PXA of FIG. 2.

Referring to FIG. 1 to FIG. 3, a pixel circuit PXA may include a constant current applying block 110 (which may also be referred to as a constant current voltage applying block), a pulse signal applying block 120, a first transistor T1A, a second transistor T2A, a third transistor T3A, a first capacitor C1A and a light emitting element EEA. In an embodiment, the pixel circuit may further C2A.

The constant current applying block 110 may receive the write gate signal GW and the data voltage VDATA. The constant current applying block 110 may apply the data voltage VDATA to the first node N1A in response to the write gate signal GW.

The pulse signal applying block 120 may receive the sweep signal SW and the pulse data voltage PWVDATA. The pulse signal applying block 120 may output an emission control signal ECS based on the pulse data voltage PWVDATA and the sweep signal SW. The pulse signal applying block 120 may apply the emission control signal ECS to the second node N2A.

The first transistor T1A may include a control electrode connected to a first node N1A, a first electrode receiving a first power voltage, and a second electrode connected to a third node N3A. The first transistor T1A may generate a driving current based on a voltage of the first node N1A. For example, the first transistor T1A may be referred to as a driving transistor.

The second transistor T2A may include a control electrode connected to a second node N2A, a first electrode receiving a second power voltage ELVSS, and a second electrode connected to a first node N1A. The second transistor T2A may apply the second power voltage ELVSS to the first node N1A in response to a voltage of the second node N2. The second transistor T2A may apply the second power voltage ELVSS to the first node N1A in response to the emission control signal ECS. For example, the second transistor T2A may be referred to as an emission control transistor.

The third transistor T3A may include a control electrode connected to the second node N2A, a first electrode receiving the second power voltage ELVSS, and a second electrode connected to the third node N3A. The third transistor T3A may apply the second power voltage ELVSS to the third node N3A in response to a voltage of the second node N2A. The third transistor T3A may apply the second power voltage ELVSS to the third node N3A in response to the emission control signal ECS. For example, third transistor T3A may be referred to as a light emitting element initialization transistor. For example, the third transistor T3A may be referred to as a push-pull transistor. In an embodiment, when the push-pull transistor is turned on, the driving current may be applied to the push-pull transistor rather than the light emitting element EE.

A first capacitor C1A may include a first electrode connected to the first node N1A, and a second electrode connected to the third node N3A.

In an embodiment, the second capacitor C2A may include a first electrode receiving the second power voltage ELVSS and a second electrode connected to the third node N3A.

The light emitting element EEA may include a first electrode connected to the third node N3A and a second electrode receiving the second power voltage ELVSS. The light emitting element EEA may emit light based on the driving current. For example, the light emitting element EEA may be an emitting diode. In an embodiment, the light emitting element EEA may be a micro emitting diode.

A frame period in which the pixel circuit PXA is driven may include a first period TP1A, a second period TP2A and a third period TP3A.

In the first period TP1A, the write gate signal GW may have an activation level. The constant current applying block 110 may apply the data voltage VDATA to the first node N1A in response to the write gate signal GW. The pulse signal applying block 120 may receive the pulse data voltage PWVDATA in response to the write gate signal GW. For example, the first period TP1A may be referred to as a writing period.

In the second period TP2A following to the first period TPIA, the sweep signal SW may be gradually decreased from a high level to a low level. The second period TP2A may be referred to as an emission-on period.

In the second period TP2A, the driving current based on the data voltage VDATA may be applied to the light emitting element EE. Accordingly, the light emitting element EE may emit light.

In the third period TP3A following to the second period TP2A, the sweep signal SW may be gradually decreased to the low level. The third period TP3A may be referred to as an emission-off period.

In the third period TP3A, the emission control signal ECS may be outputted. The second transistor T2A may be turned on in response to the emission control signal ECS. The second transistor T2A may be turned on, such that the second power voltage ELVSS may be applied to the first node N1A. The first node N1A may receive the second power voltage ELVSS, such that the first transistor T1A may be turned off. The first transistor T1A may be turned off, such that the light emitting element EE may stop emitting.

In the third period TP3A, the third transistor T3A may be turned on in response to the emission control signal ECS. The third transistor T3A may be turned on, such that the second power voltage ELVSS may be applied to the third node N3A. The third node N3A may receive the second power voltage ELVSS, such that the second power voltage ELVSS may be applied to the first light emitting element of the light emitting element EEA. The second power voltage ELVSS may be applied to the first light emitting element of the light emitting element EEA, such that the light emitting element EEA may be initialized. For example, an operation in which the second power voltage ELVSS may be applied to the first light emitting element of the light emitting element EEA may be referred to as a light emitting element initialization operation. The light emitting element EEA may be initialized, such that a black characteristic of the light emitting element EEA may be improved.

In the present embodiment, the driving transistor may be turned off in response to the emission control signal ECS. In some aspects, the push-pull transistor may be turned on in response to the emission control signal ECS. Accordingly, the light emitting element initialization operation may be performed at each pixel circuit PXA. For example, a turned off timing of each driving transistor included in the pixel circuits PXA may be synchronized to a turned on timing of each push-pull transistor included in the pixel circuits PXA. In an embodiment, a turned on timing of the driving transistor may be synchronized to a turned off timing of the push-pull transistor. Accordingly, an emitting characteristic of the pixel circuit PXA may be improved. In some aspects, the display apparatus 1 may be implemented without a driver generating a light emitting element initialization gate signal. Accordingly, an integration of the display apparatus 1 may be improved.

Figure 5:
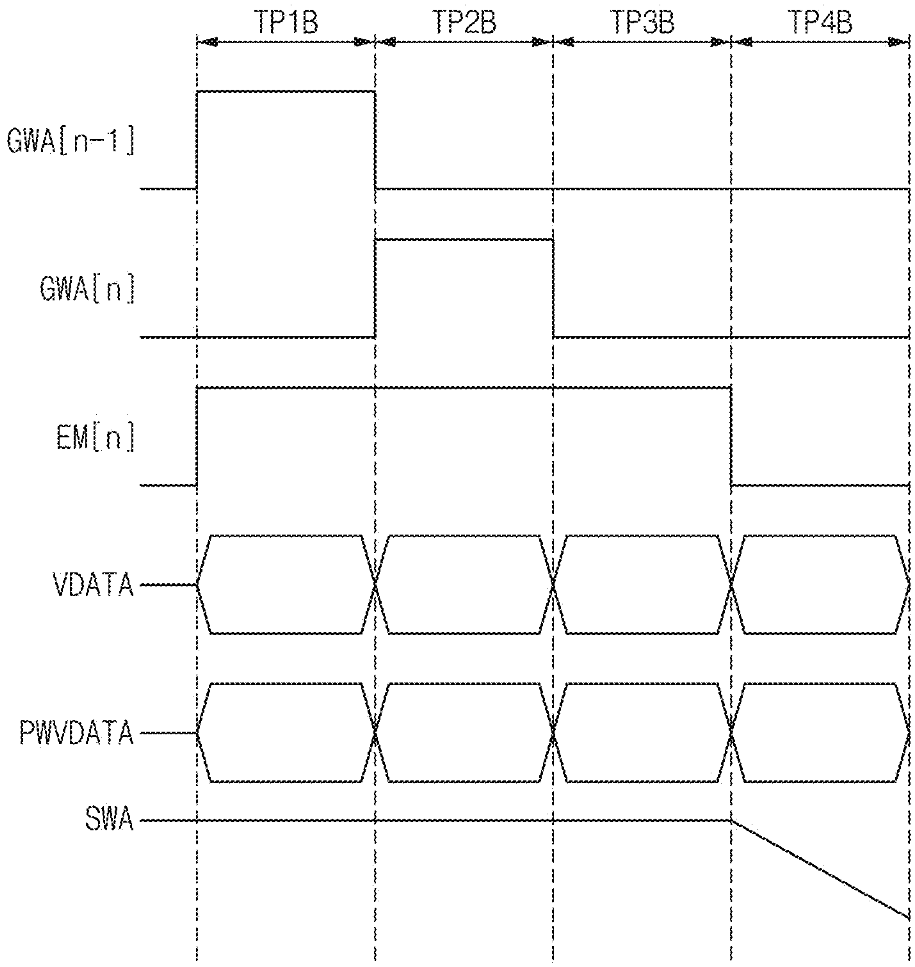
FIG. 5 is a timing diagram illustrating signals applied to a pixel circuit of FIG. 4.

FIG. 4 is a circuit diagram illustrating an example of a pixel circuit PX included in a display panel 100 of FIG. 1. FIG. 5 is a timing diagram illustrating signals applied to a pixel circuit PXB of FIG. 4.

Referring to FIG. 1, FIG. 4 and FIG. 5, a pixel circuit PXB may include first to eighth transistors T1B, T2B, T3B, T4B, T5B, T6B, T7B and T8B, a first capacitor C1B, a sweep capacitor CSW, an inverting block INV, a light emitting element EEB.

The first transistor T1B may include a control electrode connected to a first node N1B, a first electrode connected to a second node N2B, and a second electrode connected to a third node N3B. The first transistor T1B may generate a driving current based on a voltage of the first node N1B. For example, the first transistor T1B may be referred to as the driving transistor.

The second transistor T2B may include a control electrode receiving a write gate signal GWA[n], a first electrode receiving the data voltage VDATA, and a second electrode connected to the second node N2B. The second transistor T2B may apply the data voltage VDATA to the second node N2B in response to the write gate signal GWA[n]. For example, the second transistor T2B may be referred to as a write transistor.

The third transistor T3B may include a control electrode receiving the write gate signal GWA[n], a first electrode connected to the third node N3B, and a second electrode connected to the first node N1B. The third transistor T3B may connect the first node N1B and the third node N3D in response to the write gate signal GWA[n]. For example, the third transistor T3B may diode-connect the first transistor T1B. For example, the third transistor T3B may be referred to as a compensation transistor.

The fourth transistor T4B may include a control electrode receiving a previous write gate signal GWA[n−1], a first electrode receiving the second power voltage ELVSS, and a second electrode connected to the first node N1B. The fourth transistor T4B may apply the second power voltage ELVSS to the first node N1B in response to the previous write gate signal GWA[n−1]. For example, the fourth transistor T4B may be referred to as an initialization transistor.

The fifth transistor T5B may include a control electrode receiving the emission signal EM[n], a first electrode receiving the first power voltage ELVDD, and a second electrode connected to the second node N2B. The fifth transistor T5B may apply the first power voltage ELVDD to the second node N2B in response to the emission signal EM[n]. For example, the fifth transistor T5B may be referred to as a first emission transistor.

The sixth transistor T6B may include a control electrode connected to a fifth node N5B, a first electrode connected to the third node N3B, and a second electrode connected to a fourth node N4B. The emission control signal ECS may be applied to the fifth node N5B. the sixth transistor T6B may connect the third node N3B and the fourth node N4B in response to the emission control signal ECS. The sixth transistor T6B may output the driving current to the fourth node N4B in response to the emission control signal ECS. For example, the sixth transistor T6B may be referred to as an emission transistor. For example, the sixth transistor T6B may be referred to as a second emission transistor.

The seventh transistor T7B may include a control electrode connected to the fifth node N5B, a first electrode receiving the second power voltage ELVSS, and a second electrode connected to the fourth node N4B. The seventh transistor T7B may apply the second power voltage ELVSS to the fourth node N4B in response to the emission control signal ECS. For example, the seventh transistor T7B may be referred to as the light emitting element initialization transistor. For example, the seventh transistor T7B may be referred to as the push-pull transistor.

The eighth transistor T8B may include a control electrode receiving the write gate signal GWA[n], a first electrode receiving the pulse data voltage PWVDATA, and a second electrode connected to a sixth node N6B. The eighth transistor T8B may apply the pulse data voltage PWVDATA to the sixth node N6B in response to the write gate signal GWA[n]. For example, the eighth transistor T8B may be referred to as a pulse write transistor.

The inverting block INV may include an inverting input node connected to the sixth node N6B and an inverting output node connected to the fifth node N5B. The inverting block INV may output the emission control signal ECS based on a voltage of the fifth node N5B. For example, the sixth node N6B may be referred to as a pulse control node. For example, the fifth node N5B may be referred to as an output node.

The first capacitor C1B may include a first electrode receiving the first power voltage ELVDD and a second electrode connected to the first node N1B. The first capacitor C1B may store a voltage of the first node N1B. For example, the first capacitor C1B may be referred to as a storage capacitor.

The sweep capacitor CSW may include a first electrode receiving the sweep signal SWA and a second electrode connected to the sixth node N6B.

The light emitting element EEB may include a first electrode connected to the fourth node N4B and a second electrode receiving the second power voltage ELVSS. For example, the light emitting element EEB may be a light emitting diode. In an embodiment, the light emitting element EEB may be a micro light emitting diode.

In the present embodiment, the first transistor T1B, the fifth transistor T5B, the sixth transistor T6B may be P-type transistors. The second transistor T2B, the third transistor T3B, the fourth transistor T4B, the seventh transistor T7B and the eighth transistor T8B may be N-type transistors. For example, the P-type transistor may be an LTPS transistor. For example, the N-type transistor may be a semiconducting oxide transistor.

The second transistor T2B, the third transistor T3B, the fourth transistor T4B, the seventh transistor T7B and the eighth transistor T8B may be N-type transistor, such that current leakages of the second transistor T2B, the third transistor T3B, the fourth transistor T4B, the seventh transistor T7B and the eighth transistor T8B may be reduced, and the pixel circuit PXB may operate stably even when a relatively low power supply voltage is applied. In some aspects, the second transistor T2B, the third transistor T3B, the fourth transistor T4B, the seventh transistor T7B and the eighth transistor T8B may be N-type transistor, such that a power consumption of the display apparatus 1 may be reduced.

The first transistor T1B, the fifth transistor T5B, the sixth transistor T6B may be P-type transistors, such that mobilities of the first transistor T1B, the fifth transistor T5B, the sixth transistor T6B may be improved. Accordingly, a driving stability of the pixel circuit PXB may be improved.

A frame period in which the pixel circuit PXB is driven may include first to fourth periods TP1B, TP2B, TP3B and TP4B.

In the present embodiment, the activation level of the write gate signal GWA[n] may be a logic high level. The inactivation level of the write gate signal GWA[n] may be a logic low level. The activation level of the previous write gate signal GWA[n−1] may be a logic high level. The inactivation level of the previous write gate signal GWA[n−1] may be a logic low level. The activation level of the emission signal EM[n] may be a logic low level. The inactivation level of the emission signal EM[n] may be a logic high level.

In the first period TP1B, the previous write gate signal GWA[n−1] may have an activation level, the write gate signal GWA[n] may have an inactivation level, the emission signal EM[n] may have an inactivation level and the sweep signal SWA may have the high level.

In the first period TP1B, the fourth transistor T4B may be turned on in response to the previous write gate signal GWA[n−1]. The fourth transistor T4B may be turned on, such that the second power voltage ELVSS may be applied to the first node N1B. Accordingly, the first node N1B may be initialized. For example, the first period TP1B may be referred to as an initialization period.

In the second period TP2B, the previous write gate signal GWA[n−1] may have an inactivation level, the write gate signal GW[n] may have an activation level, the emission signal EM[n] may have an inactivation level and the sweep signal SWA may have the high level.

In the second period TP2B, the second transistor T2B may be turned on in response to the write gate signal GWA[n]. In some aspects, the third transistor T3B may be turned on in response to the write gate signal GWA[n]. The second transistor T2B and the third transistor T3B may be turned on, such that the data voltage VDATA may be applied to the first node N1B.

In the second period TP2B, the eighth transistor T8B may be turned on in response to the write gate signal GWA[n]. The eighth transistor T8B may be turned on, such that the pulse data voltage PWVDATA may be applied to the sixth node N6B. For example, the second period TP2B may be referred to as a write period.

In the third period TP3B, the previous write gate signal GWA[n−1] may have an inactivation level, the write gate signal GW[n] may have an inactivation level, the emission signal EM[n] may have an inactivation level and the sweep signal SWA may have the high level. For example, the third period TP3B may be referred to as an emission waiting period.

In the fourth period TP4B, the previous write gate signal GWA[n−1] may have an inactivation level, the write gate signal GW[n] may have an inactivation level, the emission signal EM[n] may have an activation level and the sweep signal SWA may be gradually decreased from the high level to the low level.

In the fourth period TP4B, fifth transistor T5B may be turned on in response to the emission signal EM[n]. The fifth transistor T5B may be turned on, such that the first power voltage ELVDD may be applied to the second node N2B. In some aspects, the emission control signal ECS may have a logic low level. Accordingly, the sixth transistor T6B may be turned on. The fifth transistor T5B and the sixth transistor T6B may be turned on, such that the driving current may be applied to the light emitting element EEB.

In the fourth period TP4B, the sweep signal SWA may be gradually decreased, such that a voltage of the sixth node N6B may be gradually decreased. For example, the fourth period TP4B may be referred to as an emission-on period.

In the fifth period TP5B, the previous write gate signal GWA[n−1] may have an inactivation level, the write gate signal GW[n] may have an inactivation level, the emission signal EM[n] may have an activation level and the sweep signal SWA may be gradually decreased to the low level.

In the fifth period TP5B, the sweep signal SWA may be gradually decreased, such that the voltage of the sixth node N6B may be gradually decreased. In an example in which the voltage of the sixth node N6B is lower than a threshold voltage of the inverting block INV, the inverting block INV may output the emission control signal ECS having a logic high level. In the fifth period TP5B, the sixth transistor T6B may be turned off in response to the emission control signal ECS. In the fifth period TP5B, the seventh transistor T7B may be turned off in response to the emission control signal ECS. Accordingly, the second power voltage ELVSS may be applied to the first electrode of the light emitting element EEB. Accordingly, the light emitting element EEB may stop emitting. A timepoint in which the sixth transistor T6B is turned off may be determined based on the pulse data voltage PWVDATA.

In the present embodiment, the emission transistor may be turned off in response to the emission control signal ECS. In some aspects, the push-pull transistor may be turned on in response to the emission control signal ECS. Accordingly, the light emitting element initialization operation may be performed at each pixel circuit PXB. For example, a turned off timing of each driving transistor included in the pixel circuits PXB may be synchronized to a turned on timing of each push-pull transistor included in the pixel circuits PXB. Accordingly, an emitting characteristic of the pixel circuit PXB may be improved. In some aspects, the display apparatus 1 may be implemented without a driver generating a light emitting element initialization gate signal. Accordingly, an integration of the display apparatus 1 may be improved.

In the present embodiment, the pixel circuit PXB may include an inverting block INV. The inverting block INV may output the emission control signal ECS based on the voltage of the sixth node N6B. For example, the emission control signal ECS may have a logic high level or a logic low level. For example, even when the voltage of the sixth node N6B is changed linearly, the emission control signal ECS may have a logic high level or a logic low level. Accordingly, the emission transistor and the push-pull transistor may be effectively controlled.

In an embodiment, a threshold voltage (e.g., an absolute value of threshold voltage) of the emission transistor may be substantially the same as a threshold voltage (e.g., an absolute value of threshold voltage) of the push-pull transistor. Accordingly, a timepoint in which the sixth transistor T6B is turned off may be substantially the same as a timepoint in which the seventh transistor T7B is turned on. Accordingly, an emission characteristic of the pixel circuit PXB may be further improved.

Figure 6:
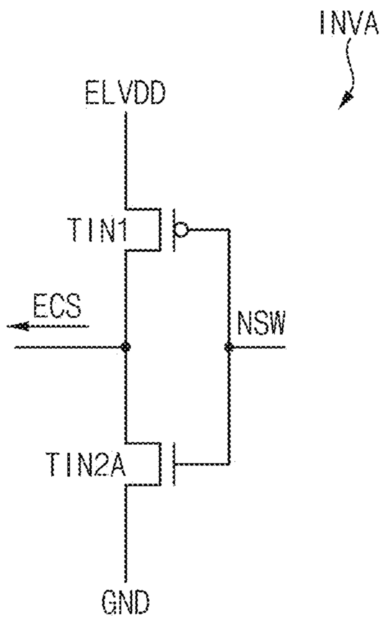
FIG. 6 is a circuit diagram illustrating an example of an inverting block included in a pixel circuit of FIG. 4.

FIG. 6 is a circuit diagram illustrating an example of an inverting block INV included in a pixel circuit PXB of FIG. 4.

Referring to FIG. 1 and FIG. 4 to FIG. 6, an inverting block INVA may include a first inverting transistor TIN1 and a second inverting transistor TIN2A.

The first inverting transistor TIN1 may include a control electrode connected to a pulse control node NSW, a first electrode receiving the first power voltage ELVDD, and a second electrode connected to the output node. The first inverting transistor TIN1 may apply the first power voltage to the output node in response to a voltage of the pulse control node NSW.

The second inverting transistor TIN2A may include a control electrode connected to the pulse control node NSW, a first electrode receiving a ground voltage GND, and a second electrode connected to the output node. The second inverting transistor TIN2A may output the ground voltage GND to the output node in response to the voltage of the pulse control node NSW. In the present embodiment, the voltage of the output node may be the emission control signal ECS. In an example in which the first power voltage ELVDD is applied to the output node, the emission control signal ECS may have the logic high level. In the present embodiment, the logic high level may be the first power voltage ELVDD. In an example in which the ground voltage GND is applied to the output node, the emission control signal ECS may have the logic low level. In the present embodiment, the logic low level may be the ground voltage GND.

Figure 7:
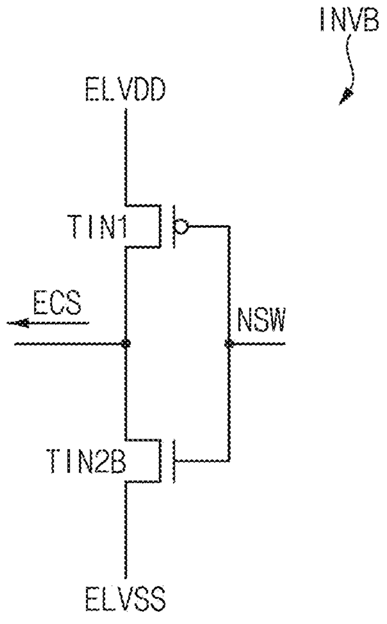
FIG. 7 is a circuit diagram illustrating an example of an inverting block included in a pixel circuit of FIG. 4.

FIG. 7 is a circuit diagram illustrating an example of an inverting block INV included in a pixel circuit PXA of FIG. 4.

Referring to FIG. 1, FIG. 4, FIG. 5 and FIG. 7, an inverting block INVB may include a first inverting transistor TIN1 and a second inverting transistor TIN2B.

The first inverting transistor TIN1 may include a control electrode connected to a pulse control node NSW, a first electrode receiving the first power voltage ELVDD, and a second electrode connected to the output node. The first inverting transistor TIN1 may apply the first power voltage to the output node in response to a voltage of the pulse control node NSW.

The second inverting transistor TIN2B may include a control electrode connected to the pulse control node NSW, a first electrode receiving the second power voltage ELVSS, and a second electrode connected to the output node. The second inverting transistor TIN2B may output the second power voltage ELVSS to the output node in response to the voltage of the pulse control node NSW. In the present embodiment, the voltage of the output node may be the emission control signal ECS. In an example in which the first power voltage ELVDD is applied to the output node, the emission control signal ECS may have the logic high level. In the present embodiment, the logic high level may be the first power voltage ELVDD. In an example in which the second power voltage ELVSS is applied to the output node, the emission control signal ECS may have the logic low level. In the present embodiment, the logic low level may be the second power voltage ELVSS.

Figure 8:
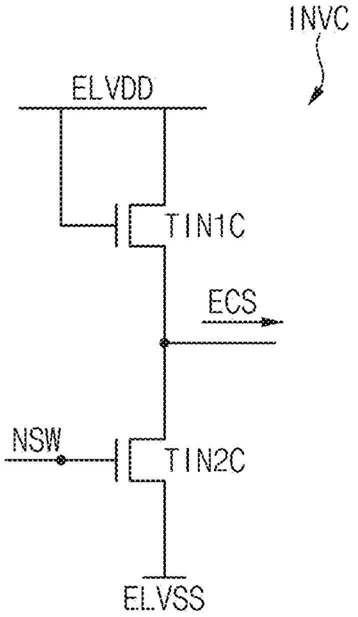
FIG. 8 is a circuit diagram illustrating an example of an inverting block included in a pixel circuit of FIG. 4.

FIG. 8 is a circuit diagram illustrating an example of an inverting block INV included in a pixel circuit PXA of FIG. 4.

Referring to FIG. 1, FIG. 4, FIG. 5 and FIG. 8, an inverting block INVC may include a first inverting transistor TIN1C and a second inverting transistor TIN2C.

The first inverting transistor TIN1C may include a control electrode receiving the first power voltage ELVDD, a first electrode receiving the first power voltage ELVDD, and a second electrode connected to the output node.

The second inverting transistor TIN2C may include a control electrode connected to the pulse control node NSW, a first electrode receiving the second power voltage ELVSS, and a second electrode connected to the output node. The second inverting transistor TIN2C may output the second power voltage ELVSS to the output node in response to the voltage of the pulse control node NSW. In the present embodiment, the voltage of the output node may be the emission control signal ECS. In an example in which the first power voltage ELVDD is applied to the output node, the emission control signal ECS may have the logic high level. In the present embodiment, the logic high level may be the first power voltage ELVDD. In an example in which the second power voltage ELVSS is applied to the output node, the emission control signal ECS may have the logic low level. In the present embodiment, the logic low level may be the second power voltage ELVSS.

Figure 9:
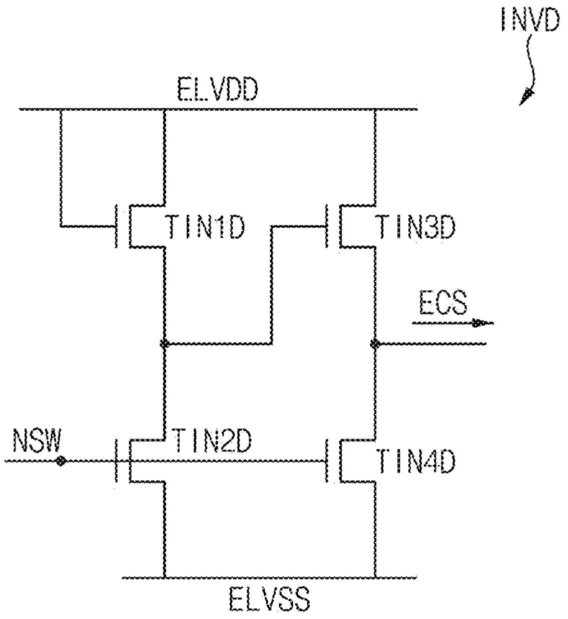
FIG. 9 is a circuit diagram illustrating an example of an inverting block included in a pixel circuit of FIG. 4.

FIG. 9 is a circuit diagram illustrating an example of an inverting block INVD included in a pixel circuit PXA of FIG. 4.

Referring to FIG. 1, FIG. 4, FIG. 5 and FIG. 9, an inverting block INVD may include a first inverting transistor TIN1D, a second inverting transistor TIN2D, a third inverting transistor TIN3D and a fourth inverting transistor TIN4D.

The first inverting transistor TIN1D may include a control electrode receiving the first power voltage ELVDD, a first electrode receiving the first power voltage ELVDD, and a second electrode connected to a control electrode of the third inverting transistor TIN3D.

The second inverting transistor TIN2D may include a control electrode connected to the pulse control node NSW, a first electrode receiving the second power voltage ELVSS, and a second electrode connected to the control electrode of the third inverting transistor TIN3D. The second inverting transistor TIN2D may apply the second power voltage ELVSS to the control electrode of the third inverting transistor TIN3D in response to a voltage of the pulse control node NSW.

The third inverting transistor TIN3D may include a control electrode connected to the second electrode of the second inverting transistor TIN2D, a first electrode receiving the first power voltage ELVDD, and a second electrode connected to the output node.

The fourth inverting transistor TIN4D may include a control electrode connected to the pulse control node NSW, a first electrode receiving the second power voltage ELVSS, and a second electrode connected to the output node. The second inverting transistor TIN2C may output the second power voltage ELVSS to the output node in response to the voltage of the pulse control node NSW. In the present embodiment, the voltage of the output node may be the emission control signal ECS. In an example in which the first power voltage ELVDD is applied to the output node, the emission control signal ECS may have the logic high level. In the present embodiment, the logic high level may be the first power voltage ELVDD. In an example in which the second power voltage ELVSS is applied to the output node, the emission control signal ECS may have the logic low level. In the present embodiment, the logic low level may be the second power voltage ELVSS.

Figure 10:
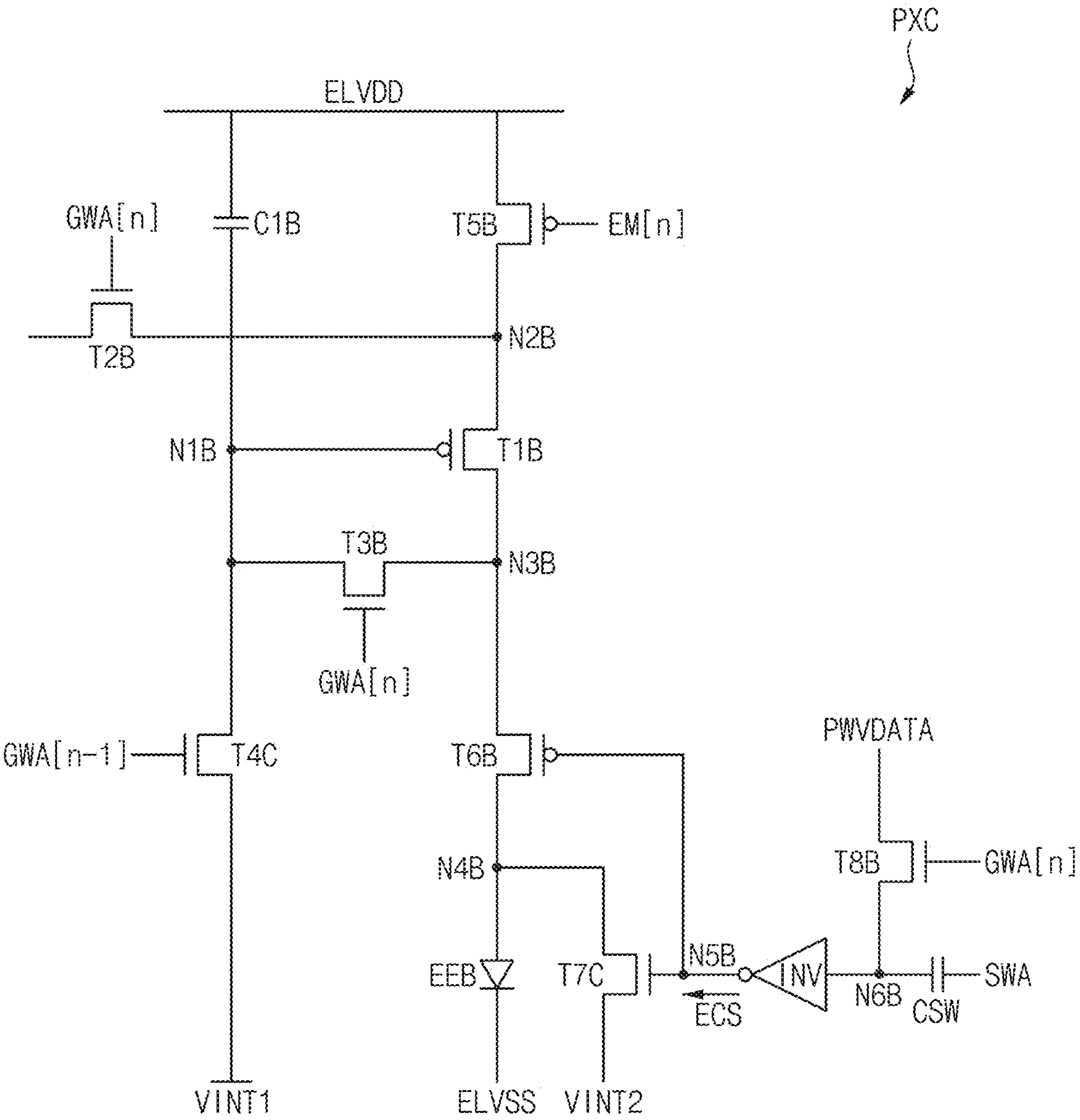
FIG. 10 is a circuit diagram illustrating an example of a pixel circuit included in a display panel of FIG. 1.

FIG. 10 is a circuit diagram illustrating an example of a pixel circuit PX included in a display panel 100 of FIG. 1.

Referring to FIG. 10, a pixel circuit PXC may include first to eighth transistors T1B, T2B, T3B, T4C, T5B, T6B, T7C and T8B, a first capacitor C1B, a sweep capacitor CSW, the inverting block INV and the light emitting element EEB.

The pixel circuit PXC is substantially the same as the pixel circuit PXB except that a first initialization voltage VINT1 is applied to a first electrode of the fourth transistor T4C, and a second initialization voltage VINT2 is applied to a first electrode of the seventh transistor T7C, such that the same reference numerals will be used and any repetitive explanation concerning the above elements will be omitted.

Referring to FIG. 1, FIG. 5 and FIG. 10, the fourth transistor T4C may include a control electrode receiving the previous write gate signal GWA[n−1], a first electrode receiving the first initialization voltage VINT1, and a second electrode connected to the first node N1B. The fourth transistor T4C may apply the initialization voltage VINT to the first node N1B in response to the previous write gate signal GWA[n−1].

In the present embodiment, the first transistor T1B, the fifth transistor T5B, the sixth transistor T6B may be P-type transistors. The second transistor T2B, the third transistor T3B, the fourth transistor T4C, the seventh transistor T7C and the eighth transistor T8B may be N-type transistors. For example, the P-type transistor may be a low temperature polysilicon (LTPS) transistor. For example, the N-type transistor may be a semiconducting oxide transistor.

The second transistor T2B, the third transistor T3B, the fourth transistor T4C, the seventh transistor T7B and the eighth transistor T8B may be N-type transistor, such that current leakages of the second transistor T2B, the third transistor T3B, the fourth transistor T4C, the seventh transistor T7C and the eighth transistor T8B may be reduced, and the pixel circuit PXC may operate stably even when a relatively low power supply voltage is applied. In some aspects, the second transistor T2B, the third transistor T3B, the fourth transistor T4B, the seventh transistor T7C and the eighth transistor T8B may be N-type transistor, such that a power consumption of the display apparatus 1 may be reduced.

The first transistor T1B, the fifth transistor T5B, the sixth transistor T6B may be P-type transistors, such that mobilities of the first transistor T1B, the fifth transistor T5B, the sixth transistor T6B may be improved. Accordingly, a driving stability of the pixel circuit PXC may be improved.

In the present embodiment, the emission transistor may be turned off in response to the emission control signal ECS. In some aspects, the push-pull transistor may be turned on in response to the emission control signal ECS. Accordingly, the light emitting element initialization operation may be performed at each pixel circuit PXC. For example, a turned off timing of each driving transistor included in the pixel circuits PXC may be synchronized to a turned on timing of each push-pull transistor included in the pixel circuits PXC. Accordingly, an emitting characteristic of the pixel circuit PXC may be improved. In some aspects, the display apparatus 1 may be implemented without a driver generating a light emitting element initialization gate signal. Accordingly, an integration of the display apparatus 1 may be improved.

In the present embodiment, the pixel circuit PXC may include the inverting block INV. The inverting block INV may output the emission control signal ECS based on the voltage of the sixth node N6B. For example, the emission control signal ECS may have a logic high level or a logic low level. For example, even when the voltage of the sixth node N6B is changed linearly, the emission control signal ECS may have a logic high level or a logic low level. Accordingly, the emission transistor and the push-pull transistor may be effectively controlled.

In an embodiment, a threshold voltage (e.g., an absolute value of threshold voltage) of the emission transistor may be substantially the same as a threshold voltage (e.g., an absolute value of threshold voltage) of the push-pull transistor. Accordingly, a timepoint in which the sixth transistor T6B is turned off may be substantially the same as a timepoint in which the seventh transistor T7C is turned on. Accordingly, an emission characteristic of the pixel circuit PXC may be further improved.

Figure 11:
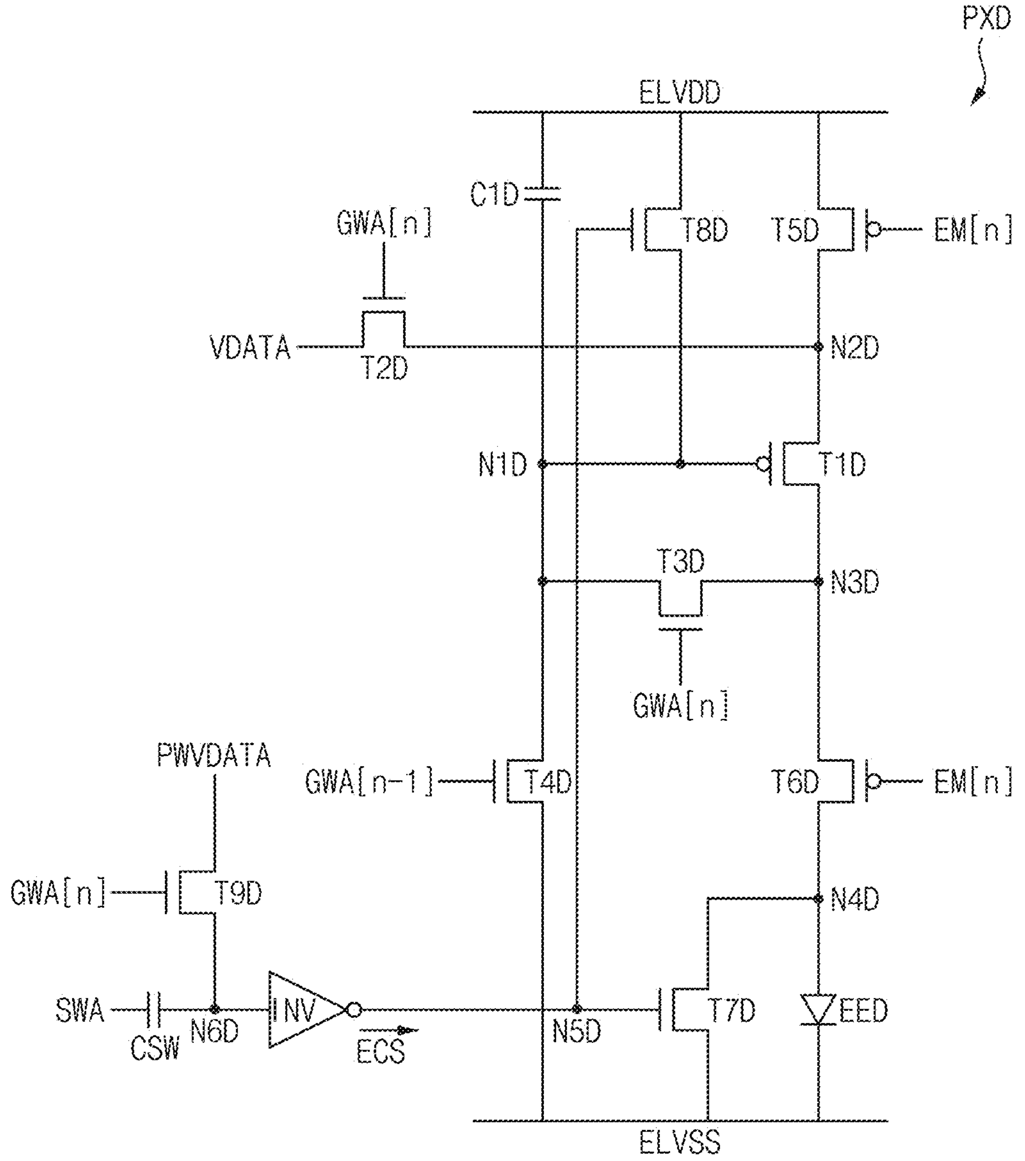
FIG. 11 is a circuit diagram illustrating an example of a pixel circuit included in a display panel of FIG. 1.

FIG. 11 is a circuit diagram illustrating an example of a pixel circuit PX included in a display panel 100 of FIG. 1.

Referring to FIG. 1, FIG. 5 and FIG. 11, a pixel circuit PXD may include first to ninth transistors T1D, T2D, T3D, T4D, T5D, T6D, T7D, T8D and T9D, a first capacitor CID, a sweep capacitor CSW, an inverting block INV, a light emitting element EED.

The first transistor T1D may include a control electrode connected to a first node N1D, a first electrode connected to a second node N2D, and a second electrode connected to a third node N3D. The first transistor T1D may generate a driving current based on a voltage of the first node N1D. For example, the first transistor T1D may be referred to as the driving transistor.

The second transistor T2D may include a control electrode receiving a write gate signal GWA[n], a first electrode receiving the data voltage VDATA, and a second electrode connected to the second node N2D. The second transistor T2D may apply the data voltage VDATA to the second node N2D in response to the write gate signal GWA[n]. For example, the second transistor T2D may be referred to as a write transistor.

The third transistor T3D may include a control electrode receiving the write gate signal GWA[n], a first electrode connected to the third node N3D, and a second electrode connected to the first node N1D. The third transistor T3D may connect the first node N1D and the third node N3D in response to the write gate signal GWA[n]. For example, the third transistor T3D may diode-connect the first transistor T1D. For example, the third transistor T3D may be referred to as a compensation transistor.

The fourth transistor T4D may include a control electrode receiving a previous write gate signal GWA[n−1], a first electrode receiving the second power voltage ELVSS, and a second electrode connected to the first node N1D. The fourth transistor T4D may apply the second power voltage ELVSS to the first node N1D in response to the previous write gate signal GWA[n−1]. For example, the fourth transistor T4D may be referred to as an initialization transistor.

The fifth transistor T5D may include a control electrode receiving the emission signal EM[n], a first electrode receiving the first power voltage ELVDD, and a second electrode connected to the second node N2D. The fifth transistor T5D may apply the first power voltage ELVDD to the second node N2D in response to the emission signal EM[n]. For example, the fifth transistor T5D may be referred to as a first emission transistor.

The sixth transistor T6D may include a control electrode receiving the emission signal EM[n], a first electrode connected to the third node N3D, and a second electrode connected to a fourth node N4D. The sixth transistor T6D may connect the third node N3D and the fourth node N4D in response to the emission signal EM[n]. The sixth transistor T6D may output the driving current to the fourth node N4D in response to the emission signal EM[n]. For example, the sixth transistor T6D may be referred to as an emission transistor. For example, the sixth transistor T6D may be referred to as a second emission transistor.

The seventh transistor T7D may include a control electrode connected to the fifth node N5D, a first electrode receiving the second power voltage ELVSS, and a second electrode connected to the fourth node N4D. The seventh transistor T7D may apply the second power voltage ELVSS to the fourth node N4D in response to the emission control signal ECS. For example, the seventh transistor T7D may be referred to as the light emitting element initialization transistor. For example, the seventh transistor T7D may be referred to as the push-pull transistor.

The eighth transistor T8D may include a control electrode connected to the fifth node N5D, a first electrode receiving the first power voltage ELVDD, and a second electrode connected to the first node N1D. The eighth transistor T8D may apply the first power voltage ELVDD to the first node N1D in response to a voltage of the fifth node N5D. For example, the eighth transistor T8D may be referred to as the emission control transistor.

The ninth transistor T9D may include a control electrode receiving the write gate signal GWA[n], a first electrode receiving the pulse data voltage PWVDATA, and a second electrode connected to the sixth node N6D. The ninth transistor T9D may apply the pulse data voltage PWVDATA to the sixth node N6D in response to the write gate signal GWA[n]. For example, the ninth transistor T9D may be referred to as a pulse write transistor.

The inverting block INV may include an inverting input node connected to the sixth node N6D and an inverting output node connected to the fifth node N5D. The inverting block INV may output the emission control signal ECS based on a voltage of the sixth node N6D. For example, the sixth node N6D may be referred to as a pulse control node. For example, the fifth node N5D may be referred to as an output node.

The first capacitor CID may include a first electrode receiving the first power voltage ELVDD and a second electrode connected to the first node N1D. The first capacitor C1D may store a voltage of the first node N1D. For example, the first capacitor CID may be referred to as a storage capacitor.

The sweep capacitor CSW may include a first electrode receiving the sweep signal SWA and a second electrode connected to the sixth node N6D.

The light emitting element EED may include a first electrode connected to the fourth node N4D and a second electrode receiving the second power voltage ELVSS. For example, the light emitting element EED may be a light emitting diode. In an embodiment, the light emitting element EED may be a micro light emitting diode.

In the present embodiment, the first transistor T1D, the fifth transistor T5D, the sixth transistor T6D may be P-type transistors. The second transistor T2D, the third transistor T3D, the fourth transistor T4D, the seventh transistor T7D, the eighth transistor T8D and the ninth transistor T9D may be N-type transistors. For example, the P-type transistor may be an LTPS transistor. For example, the N-type transistor may be a semiconducting oxide transistor.

The second transistor T2D, the third transistor T3D, the fourth transistor T4D, the seventh transistor T7D, the eighth transistor T8D and the ninth transistor T9D may be N-type transistor, such that current leakages of the second transistor T2D, the third transistor T3D, the fourth transistor T4D, the seventh transistor T7D, the eighth transistor T8D and the ninth transistor T9D may be reduced, and the pixel circuit PXD may operate stably even when a relatively low power supply voltage is applied. In some aspects, second transistor T2D, the third transistor T3D, the fourth transistor T4D, the seventh transistor T7D, the eighth transistor T8D and the ninth transistor T9D may be N-type transistor, such that a power consumption of the display apparatus 1 may be reduced.

The first transistor T1D, the fifth transistor T5D, the sixth transistor T6D may be P-type transistors, such that mobilities of the first transistor T1D, the fifth transistor T5D, the sixth transistor T6D may be improved. Accordingly, a driving stability of the pixel circuit PXD may be improved.

In the first period TP1B, the fourth transistor T4D may be turned on in response to the previous write gate signal GWA[n−1]. The fourth transistor T4D may be turned on, such that the second power voltage ELVSS may be applied to the first node N1D. Accordingly, the first node N1D may be initialized.

In the second period TP2B, the second transistor T2D may be turned on in response to the write gate signal GWA[n]. In some aspects, the third transistor T3D may be turned on in response to the write gate signal GWA[n]. The second transistor T2D and the third transistor T3D may be turned on, such that the data voltage VDATA may be applied to the first node N1D.

In the second period TP2B, the ninth transistor T9D may be turned on in response to the write gate signal GWA[n]. The ninth transistor T9D may be turned on, such that the pulse data voltage PWVDATA may be applied to the sixth node N6D.

In the fourth period TP4B, the fifth transistor T5D and the sixth transistor T6D may be turned on in response to the emission signal EM[n]. The fifth transistor T5D may be turned on, such that the first power voltage ELVDD may be applied to the second node N2D. The sixth transistor T6B may be turned on, such that the driving current may be applied to the light emitting element EEB. Accordingly, the light emitting element EED may emit light based on the driving current.

In the fourth period TP4B, the sweep signal SWA may be gradually decreased, such that a voltage of the sixth node N6B may be gradually decreased. For example, the fourth period TP4B may be referred to as an emission-on period.

In the fifth period TP5B, the sweep signal SWA may be gradually decreased, such that the voltage of the sixth node N6D may be gradually decreased. In an example in which the voltage of the sixth node N6D is lower than a threshold voltage of the inverting block INV, the inverting block INV may output the emission control signal ECS having a logic high level. In the fifth period TP5B, the eighth transistor T8D may be turned on in response to the emission control signal ECS. The eighth transistor T8D may be turned on, such that the first power voltage ELVDD may be applied to the first node N1D. The first power voltage ELVDD may be applied to the first node N1D, such that the first transistor T1D may be turned off. In the fifth period TP5B, the seventh transistor T7D may be turned on in response to the emission control signal ECS. Accordingly, the second power voltage ELVSS may be applied to the first electrode of the light emitting element EED. Accordingly, the light emitting element EED may stop emitting. A timepoint in which the eighth transistor T8D is turned off may be determined based on the pulse data voltage PWVDATA.

In the present embodiment, the emission control transistor may be turned off in response to the emission control signal ECS. In some aspects, the push-pull transistor may be turned on in response to the emission control signal ECS. Accordingly, the light emitting element initialization operation may be performed at each pixel circuit PXD. For example, a turned off timing of each driving transistor included in the pixel circuits PXD may be synchronized to a turned on timing of each push-pull transistor included in the pixel circuits PXD. Accordingly, an emitting characteristic of the pixel circuit PXD may be improved. In some aspects, the display apparatus 1 may be implemented without a driver generating a light emitting element initialization gate signal. Accordingly, an integration of the display apparatus 1 may be improved.

In the present embodiment, the pixel circuit PXD may include an inverting block INV. The inverting block INV may output the emission control signal ECS based on the voltage of the sixth node N6D. For example, the emission control signal ECS may have a logic high level or a logic low level. For example, even when the voltage of the sixth node N6D is changed linearly, the emission control signal ECS may have a logic high level or a logic low level. Accordingly, the emission transistor and the push-pull transistor may be effectively controlled.

In an embodiment, a threshold voltage (e.g., an absolute value of threshold voltage) of the emission transistor may be substantially the same as a threshold voltage (e.g., an absolute value of threshold voltage) of the push-pull transistor. Accordingly, a timepoint in which the seventh transistor T7D is turned off may be substantially the same as a timepoint in which the eighth transistor T8D is turned on. Accordingly, an emission characteristic of the pixel circuit PXD may be further improved.

Figure 12:
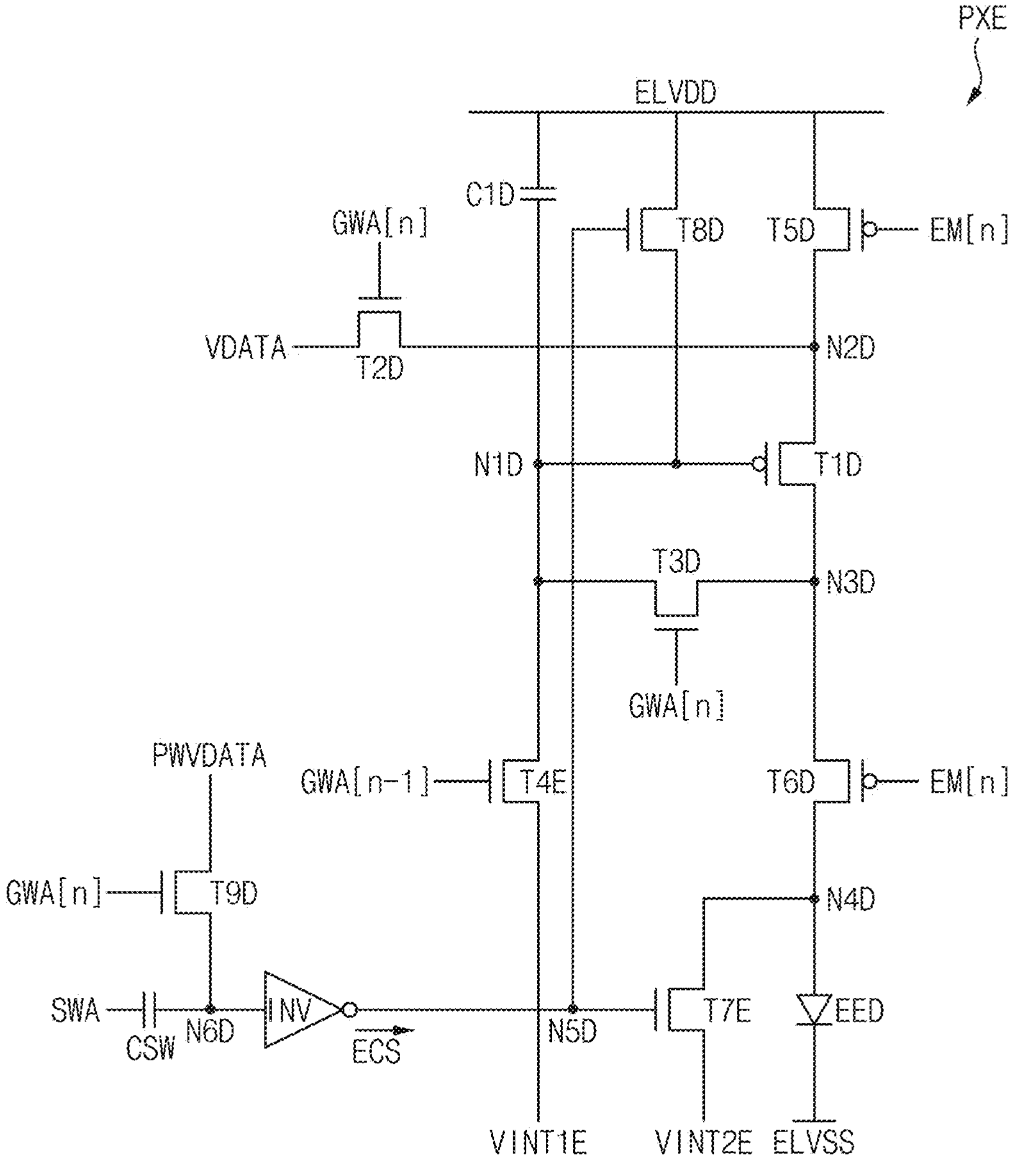
FIG. 12 is a circuit diagram illustrating an example of a pixel circuit included in a display panel of FIG. 1.

FIG. 12 is a circuit diagram illustrating an example of a pixel circuit PX included in a display panel 100 of FIG. 1.

Referring to FIG. 12, a pixel circuit PXE may include first to ninth transistors T1D, T2D, T3D, T4E, T5D, T6D, T7E, T8B and T9D, a first capacitor C1D, a sweep capacitor CSW, the inverting block INV and the light emitting element EED.

The pixel circuit PXE is substantially the same as the pixel circuit PXD except that a first initialization voltage VINT1 is applied to a first electrode of the fourth transistor T4E, and a second initialization voltage VINT2 is applied to a first electrode of the seventh transistor T7E, such that the same reference numerals will be used and any repetitive explanation concerning the above elements will be omitted.

Referring to FIG. 1, FIG. 5 and FIG. 11, the fourth transistor T4E may include a control electrode receiving the previous write gate signal GWA[n−1], a first electrode receiving the initialization voltage VINT1E, and a second electrode connected to the first node N1D. The fourth transistor T4E may apply the initialization voltage VINT1E to the first node N1D in response to the previous write gate signal GWA[n−1].

The seventh transistor T7E may include a control electrode receiving the emission control signal ECS, a first electrode receiving a second initialization voltage VINT2E, and a second electrode connected to the fourth node N4D. The seventh transistor TE may apply the second initialization voltage VINT2E to the fourth node N4D in response to the emission control signal ECS. For example, the second initialization voltage VINT2E may be lower than the second power voltage ELVSS. The second initialization voltage VINT2E may be lower than the second power voltage ELVSS, such that a black characteristic of the pixel circuit PXE may be further improved.

In the present embodiment, the first transistor T1D, the fifth transistor T5D, the sixth transistor T6D may be P-type transistors. The second transistor T2D, the third transistor T3D, the fourth transistor T4E, the seventh transistor T7E, the eighth transistor T8D and the ninth transistor T9D may be N-type transistors. For example, the P-type transistor may be an LTPS transistor. For example, the N-type transistor may be a semiconducting oxide transistor.

The second transistor T2D, the third transistor T3D, the fourth transistor T4E, the seventh transistor T7E, the eighth transistor T8D and the ninth transistor T9D may be N-type transistor, such that current leakages of the second transistor T2D, the third transistor T3D, the fourth transistor T4E, the seventh transistor T7E, the eighth transistor T8D and the ninth transistor T9D may be reduced, and the pixel circuit PXD may operate stably even when a relatively low power supply voltage is applied. In some aspects, second transistor T2D, the third transistor T3D, the fourth transistor T4E, the seventh transistor T7E, the eighth transistor T8D and the ninth transistor T9D may be N-type transistor, such that a power consumption of the display apparatus 1 may be reduced.

The first transistor T1D, the fifth transistor T5D, the sixth transistor T6D may be P-type transistors, such that mobilities of the first transistor T1D, the fifth transistor T5D, the sixth transistor T6D may be improved. Accordingly, a driving stability of the pixel circuit PXD may be improved.

In the present embodiment, the emission control transistor may be turned off in response to the emission control signal ECS. In some aspects, the push-pull transistor may be turned on in response to the emission control signal ECS. Accordingly, the light emitting element initialization operation may be performed at each pixel circuit PXE. For example, a turned off timing of each driving transistor included in the pixel circuits PXE may be synchronized to a turned on timing of each push-pull transistor included in the pixel circuits PXE. Accordingly, an emitting characteristic of the pixel circuit PXE may be improved. In some aspects, the display apparatus 1 may be implemented without a driver generating a light emitting element initialization gate signal. Accordingly, an integration of the display apparatus 1 may be improved.

In the present embodiment, the pixel circuit PXE may include the inverting block INV. The inverting block INV may output the emission control signal ECS based on the voltage of the sixth node N6D. For example, the emission control signal ECS may have a logic high level or a logic low level. For example, even when the voltage of the sixth node N6D is changed linearly, the emission control signal ECS may have a logic high level or a logic low level. Accordingly, the emission control transistor and the push-pull transistor may be effectively controlled.

In an embodiment, a threshold voltage (e.g., an absolute value of threshold voltage) of the emission transistor may be substantially the same as a threshold voltage (e.g., an absolute value of threshold voltage) of the push-pull transistor. Accordingly, a timepoint in which the seventh transistor T7E is turned off may be substantially the same as a timepoint in which the eighth transistor T8D is turned on. Accordingly, an emission characteristic of the pixel circuit PXE may be further improved.

Figure 13:
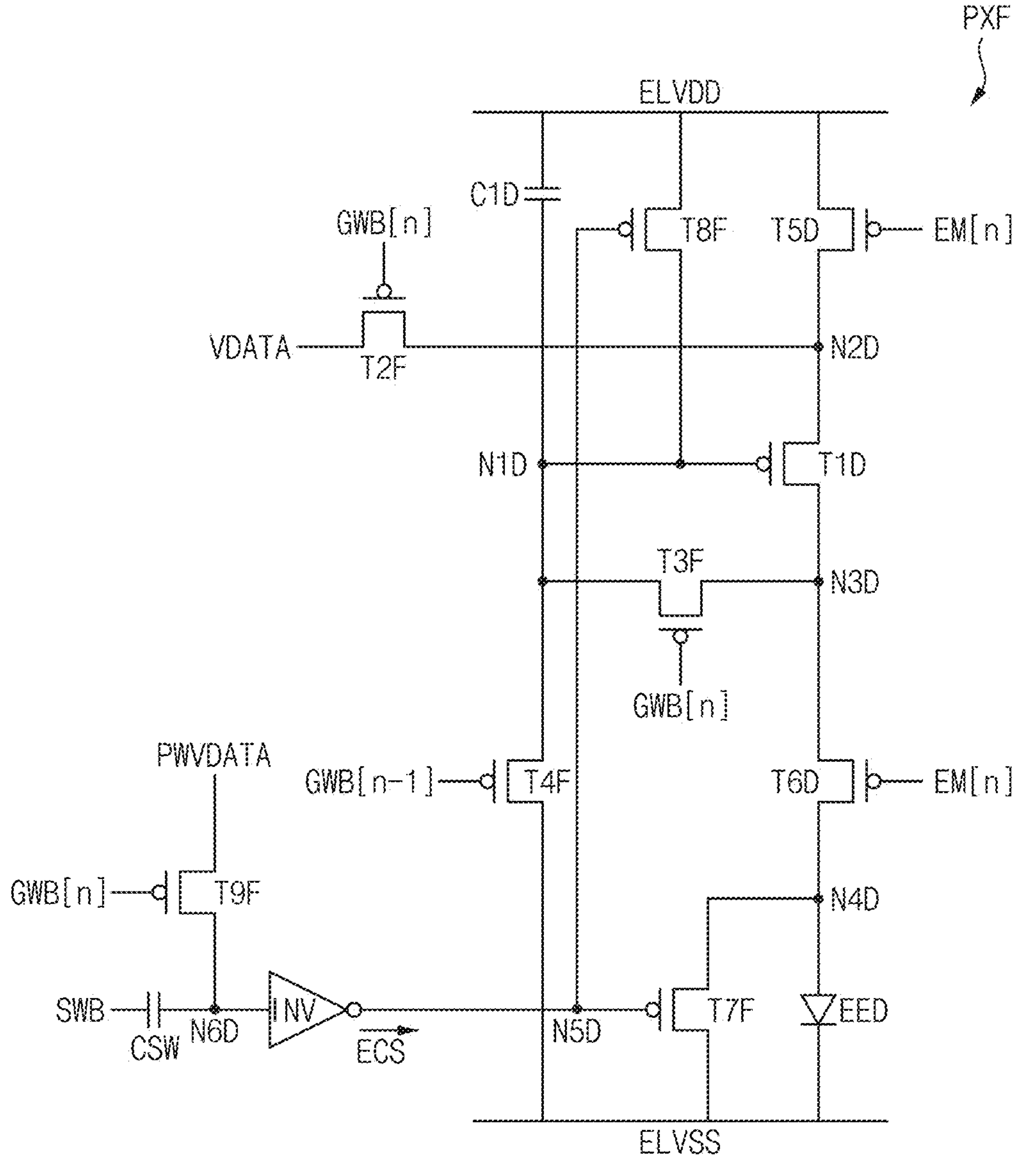
FIG. 13 is a circuit diagram illustrating an example of a pixel circuit included in a display panel of FIG. 1.

FIG. 13 is a circuit diagram illustrating an example of a pixel circuit PX included in a display panel 100 of FIG. 1.

Referring to FIG. 13, a pixel circuit PXF may include first to ninth transistors T1D, T2F, T3F, T4F, T5F, T6F, T7F, T8F and T9F, a first capacitor C1D, a sweep capacitor CSW, the inverting block INV and the light emitting element EED.

The pixel circuit PXF is substantially the same as the pixel circuit PXD except that the first to ninth transistors T1D, T2F, T3F, T4F, T5F, T6F, T7F, T8F and T9F are P-type transistors, such that the same reference numerals will be used and any repetitive explanation concerning the above elements will be omitted.

Figure 14:
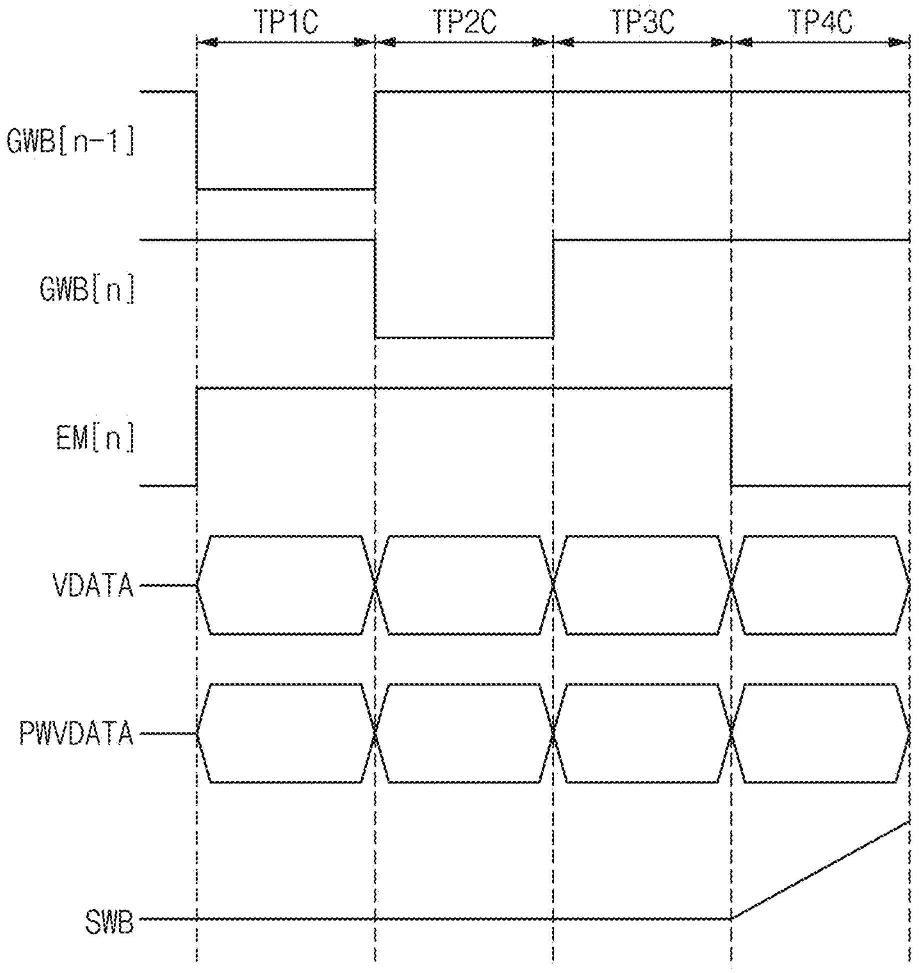
FIG. 14 is a timing diagram illustrating signals applied to a pixel circuit of FIG. 13.

FIG. 14 is a timing diagram illustrating signals applied to a pixel circuit PXF of FIG. 13.

A timing diagram according to the present embodiment is substantially the same as a timing diagram of FIG. 4 except that an activation level of a write gate signal GWB[n] may be a logic low level, an inactivation level of a write gate signal GWB[n] may be a logic high level, an activation level of a previous write gate signal GWB[n−1] may be a logic low level, an inactivation level of a previous write gate signal GWB[n−1] may be a logic high level and a sweep signal SWB is gradually increased from the low level to the high level, such that the same reference numerals will be used and any repetitive explanation concerning the above elements will be omitted.

In the present embodiment, the emission control transistor may be turned off in response to the emission control signal ECS. In some aspects, the push-pull transistor may be turned on in response to the emission control signal ECS. Accordingly, the light emitting element initialization operation may be performed at each pixel circuit PXF. For example, a turned off timing of each driving transistor included in the pixel circuits PXF may be synchronized to a turned on timing of each push-pull transistor included in the pixel circuits PXF. Accordingly, an emitting characteristic of the pixel circuit PXF may be improved. In some aspects, the display apparatus 1 may be implemented without a driver generating a light emitting element initialization gate signal. Accordingly, an integration of the display apparatus 1 may be improved.

In the present embodiment, the pixel circuit PXF may include the inverting block INV. The inverting block INV may output the emission control signal ECS based on the voltage of the sixth node N6D. For example, the emission control signal ECS may have a logic high level or a logic low level. For example, even when the voltage of the sixth node N6D is changed linearly, the emission control signal ECS may have a logic high level or a logic low level. Accordingly, the emission control transistor and the push-pull transistor may be effectively controlled.

Figure 15:
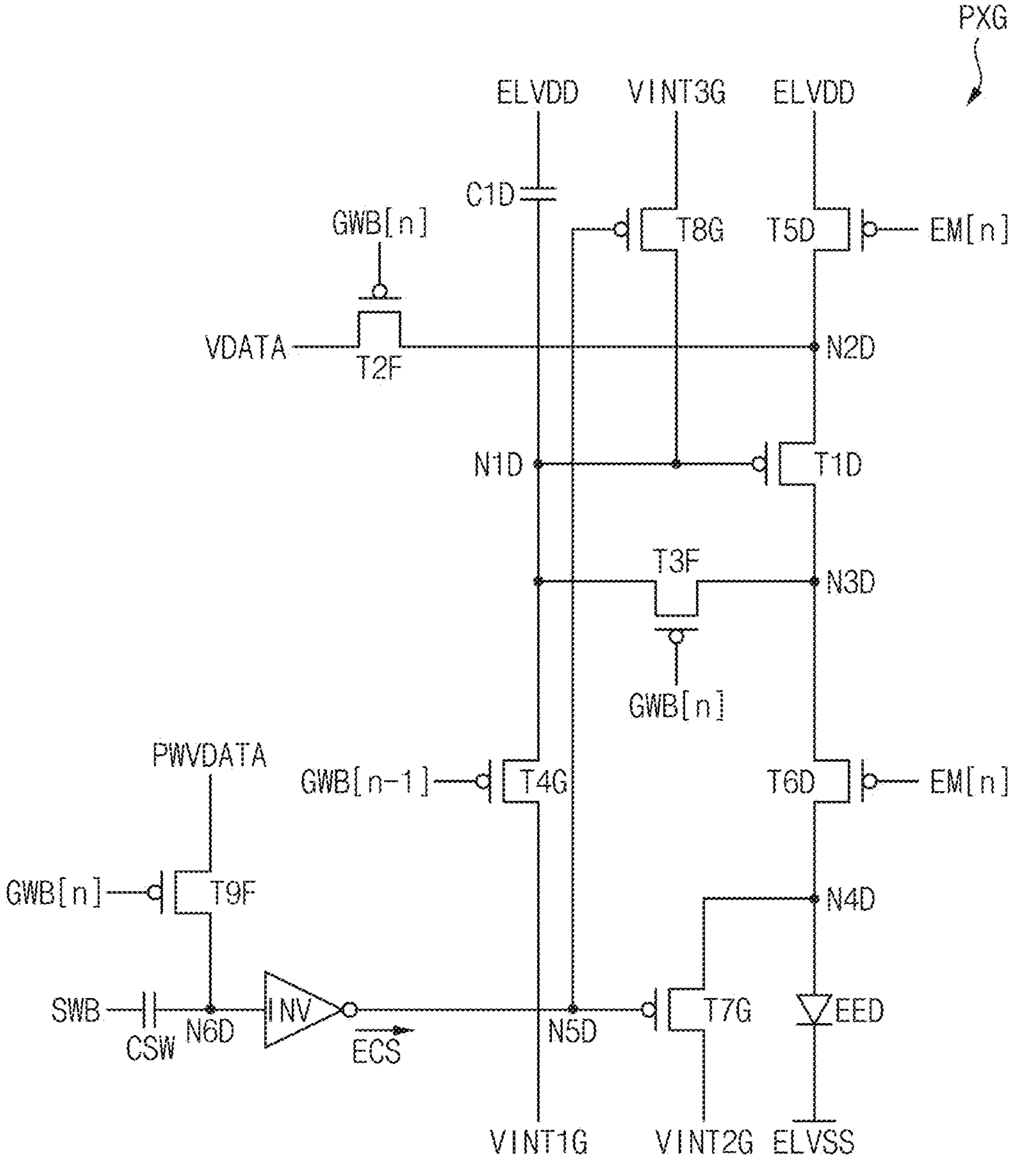
FIG. 15 is a circuit diagram illustrating an example of a pixel circuit included in a display panel of FIG. 1.

FIG. 15 is a circuit diagram illustrating an example of a pixel circuit PX included in a display panel 100 of FIG. 1.

Referring to FIG. 10, a pixel circuit PXG may include first to ninth transistors T1D, T2F, T3F, T4G, T5D, T6D, T7G, T8G and T9F, a first capacitor C1D, a sweep capacitor CSW, the inverting block INV and the light emitting element EED.

The pixel circuit PXG according to present embodiment is substantially the same as the pixel circuit PXF of FIG. 13 except that a first initialization voltage VINT1G is applied to a first electrode of the fourth transistor T4G, a second initialization voltage VINT2G is applied to a first electrode of the seventh transistor T7G and a third initialization voltage VINT3G is applied to a first electrode of the eighth transistor T8G such that the same reference numerals will be used and any repetitive explanation concerning the above elements will be omitted.

Referring to FIG. 1, FIG. 5 and FIG. 15, the fourth transistor T4G may include a control electrode receiving the previous write gate signal GWA[n−1], a first electrode receiving the first initialization voltage VINT1G, and a second electrode connected to the first node N1D. The fourth transistor T4G may apply the first initialization voltage VINT1G to the first node N1D in response to the previous write gate signal GWA[n−1].

The seventh transistor T7G may include a control electrode receiving emission control signal ECS, a first electrode receiving the second initialization voltage VINT2G, and a second electrode connected to the fourth node N4D. The seventh transistor T7G may apply the second initialization voltage VINT2G to the fourth node N4D in response to the emission control signal ECS. For example, the second initialization voltage VINT2G may be lower than the second power voltage ELVSS. The second initialization voltage VINT2G may be lower than the second power voltage ELVSS, such that a black characteristic of the pixel circuit PXG may be further improved.

The eighth transistor T8G may include a control electrode receiving emission control signal ECS, a first electrode receiving the third initialization voltage VINT3G, and a second electrode connected to the first node N1D. The eighth transistor T8G may apply the third initialization voltage VINT3G to the first node N1D in response to the emission control signal ECS.

In the present embodiment, the emission control transistor may be turned off in response to the emission control signal ECS. In some aspects, the push-pull transistor may be turned on in response to the emission control signal ECS. Accordingly, the light emitting element initialization operation may be performed at each pixel circuit PXG. For example, a turned off timing of each driving transistor included in the pixel circuits PXG may be synchronized to a turned on timing of each push-pull transistor included in the pixel circuits PXG. Accordingly, an emitting characteristic of the pixel circuit PXG may be improved. In some aspects, the display apparatus 1 may be implemented without a driver generating a light emitting element initialization gate signal. Accordingly, an integration of the display apparatus 1 may be improved.

In the present embodiment, the pixel circuit PXG may include the inverting block INV. The inverting block INV may output the emission control signal ECS based on the voltage of the sixth node N6D. For example, the emission control signal ECS may have a logic high level or a logic low level. For example, even when the voltage of the sixth node N6D is changed linearly, the emission control signal ECS may have a logic high level or a logic low level. Accordingly, the emission control transistor and the push-pull transistor may be effectively controlled.

In an embodiment, a threshold voltage (e.g., an absolute value of threshold voltage) of the emission control transistor may be substantially the same as a threshold voltage (e.g., an absolute value of threshold voltage) of the push-pull transistor. Accordingly, a timepoint in which the seventh transistor T7G is turned on may be substantially the same as a timepoint in which the eighth transistor T8G is turned on. Accordingly, an emission characteristic of the pixel circuit PXG may be further improved.

Figure 16:
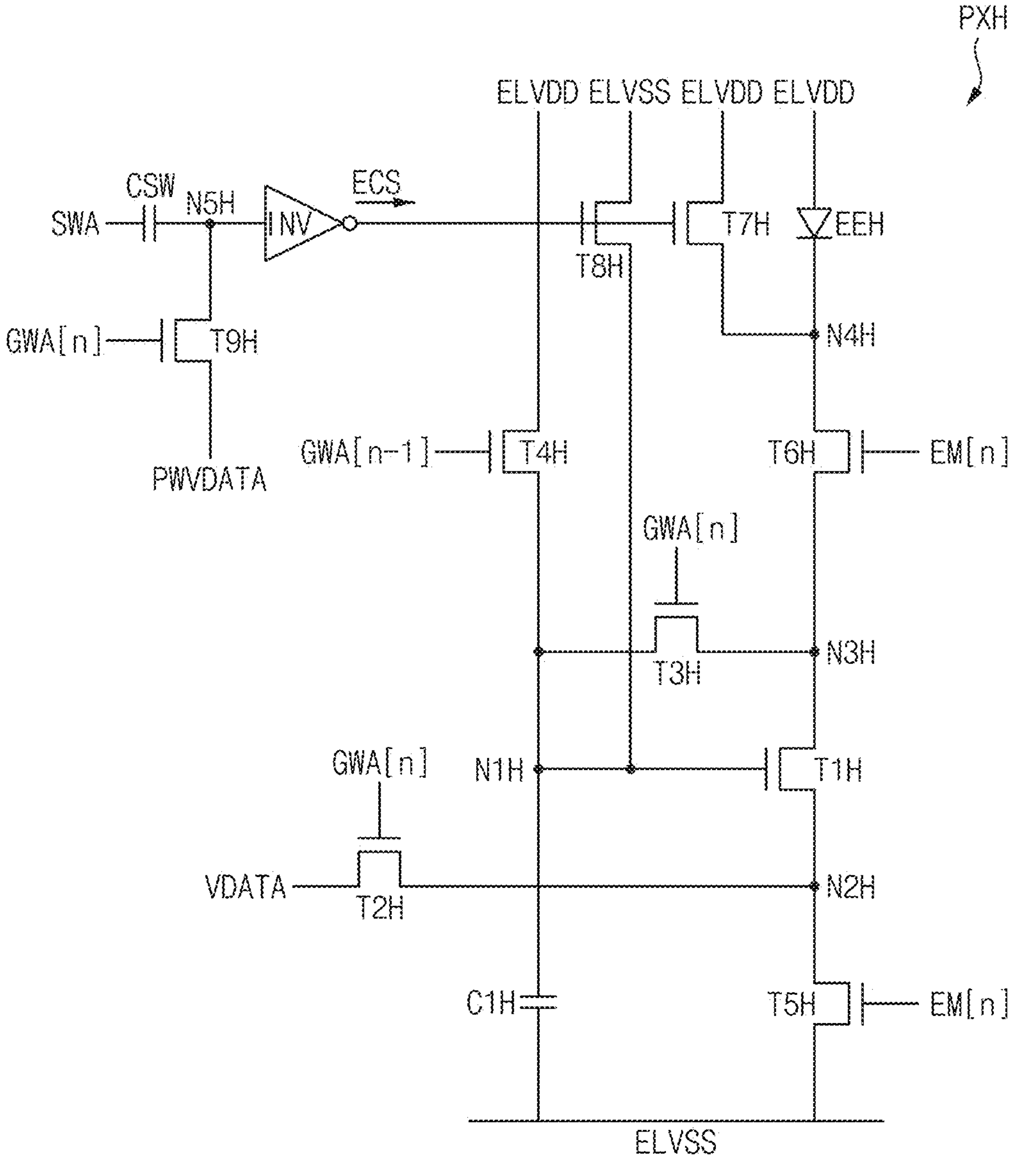
FIG. 16 is a circuit diagram illustrating an example of a pixel circuit included in a display panel of FIG. 1.

FIG. 16 is a circuit diagram illustrating an example of a pixel circuit PX included in a display panel 100 of FIG. 1.

Referring to FIG. 1 and FIG. 16, a pixel circuit PXD may include first to ninth transistors T1H, T2H, T3H, T4H, T5H, T6H, T7H, T8H and T9H, a first capacitor C1H, a sweep capacitor CSW, an inverting block INV, a light emitting element EEH.

The first transistor T1H may include a control electrode connected to a first node N1H, a first electrode connected to a second node N2H, and a second electrode connected to a third node N3H. The first transistor T1H may generate a driving current based on a voltage of the first node N1H. For example, the first transistor T1H may be referred to as the driving transistor.

The second transistor T2H may include a control electrode receiving a write gate signal GWA[n], a first electrode receiving the data voltage VDATA, and a second electrode connected to the second node N2H. The second transistor T2H may apply the data voltage VDATA to the second node N2H in response to the write gate signal GWA[n]. For example, the second transistor T2H may be referred to as a write transistor.

The third transistor T3H may include a control electrode receiving the write gate signal GWA[n], a first electrode connected to the third node N3H, and a second electrode connected to the first node N1H. The third transistor T3H may connect the first node N1H and the third node N3H in response to the write gate signal GWA[n]. For example, the third transistor T3H may diode-connect the first transistor T1H. For example, the third transistor T3H may be referred to as a compensation transistor.

The fourth transistor T4H may include a control electrode receiving a previous write gate signal GWA[n−1], the second electrode receiving the second power voltage ELVDD, and a second electrode connected to the first node N1H. The fourth transistor T4G may apply the first power voltage ELVDD to the first node N1H in response to the previous write gate signal GWA[n−1]. For example, the fourth transistor T4H may be referred to as the initialization transistor.

The fifth transistor T5H may include a control electrode receiving the emission signal EMA[n], a first electrode receiving the second power voltage ELVSS, and a second electrode connected to the second node N2H. The fifth transistor T5H may apply the second power voltage ELVSS to the second node N2H in response to the emission signal EMA[n]. For example, the fifth transistor T5D may be referred to as a first emission transistor.

The sixth transistor T6H may include a control electrode receiving the emission signal EMA[n], a first electrode connected to the third node N3H, and a second electrode connected to a fourth node N4H. The sixth transistor T6H may connect the third node N3H and the fourth node N4H in response to the emission signal EMA[n]. The sixth transistor T6H may output the driving current to the fourth node N4H in response to the emission signal EMA[n]. For example, the sixth transistor T6H may be referred to as an emission transistor. For example, the sixth transistor T6H may be referred to as a second emission transistor.

The seventh transistor T7H may include a control electrode receiving the emission control signal ECS, a first electrode receiving the first power voltage ELVDD, and a second electrode connected to the fourth node N4H. The seventh transistor TH may apply the first power voltage ELVDD to the fourth node N4H in response to the emission control signal ECS. For example, the seventh transistor T7D may be referred to as the light emitting element initialization transistor. For example, the seventh transistor T7H may be referred to as the push-pull transistor.

The eighth transistor T8H may include a control electrode receiving the emission control signal ECS, a first electrode receiving the second power voltage ELVSS, and a second electrode connected to the first node N1H. The eighth transistor T8H may apply the second power voltage ELVSS to the first node N1H in response to the emission control signal ECS. For example, the eighth transistor T8H may be referred to as the emission control transistor.

The ninth transistor T9H may include a control electrode receiving the write gate signal GWA[n], a first electrode receiving the pulse data voltage PWVDATA, and a second electrode connected to the fifth node N5H. The ninth transistor T9D may apply the pulse data voltage PWVDATA to the fifth node N5H in response to the write gate signal GWA[n]. For example, the ninth transistor T9H may be referred to as a pulse write transistor.

In the present embodiment, the first to ninth transistors T1H, T2H, T3H, T4H, T5H, T6H, T7H, T8H and T9H may be N-type transistors.

The inverting block INV may include an inverting input node connected to the fifth node N5H and an inverting output node outputting the emission control signal ECS. The inverting block INV may output the emission control signal ECS based on a voltage of the fifth node N5H. For example, the fifth node N5H may be referred to as a pulse control node.

The first capacitor C1H may include a first electrode receiving the second power voltage ELVSS and a second electrode connected to the first node N1H. The first capacitor C1D may store a voltage of the first node N1H. For example, the first capacitor C1D may be referred to as a storage capacitor.

The sweep capacitor CSW may include a first electrode receiving the sweep signal SWA and a second electrode connected to the fifth node N6H.

The light emitting element EEH may include a first electrode receiving the first power voltage ELVDD and a second electrode connected to the fourth node N4H. For example, the light emitting element EED may be a light emitting diode. In an embodiment, the light emitting element EED may be a micro light emitting diode. In the present embodiment, the first electrode of the light emitting element EEH may be an anode. In the present embodiment, the second electrode of the light emitting element EEH may be a cathode.

In the present embodiment, the emission control transistor may be turned off in response to the emission control signal ECS. In some aspects, the push-pull transistor may be turned on in response to the emission control signal ECS. Accordingly, the light emitting element initialization operation may be performed at each pixel circuit PXH. For example, a turned off timing of each driving transistor included in the pixel circuits PXH may be synchronized to a turned on timing of each push-pull transistor included in the pixel circuits PXH. Accordingly, an emitting characteristic of the pixel circuit PXH may be improved. In some aspects, the display apparatus 1 may be implemented without a driver generating a light emitting element initialization gate signal. Accordingly, an integration of the display apparatus 1 may be improved.

In the present embodiment, the pixel circuit PXH may include the inverting block INV. The inverting block INV may output the emission control signal ECS based on the voltage of the fifth node N5H. For example, the emission control signal ECS may have a logic high level or a logic low level. For example, even when the voltage of the fifth node N5H is changed linearly, the emission control signal ECS may have a logic high level or a logic low level. Accordingly, the emission control transistor and the push-pull transistor may be effectively controlled.

In an embodiment, a threshold voltage (e.g., an absolute value of threshold voltage) of the emission control transistor may be substantially the same as a threshold voltage (e.g., an absolute value of threshold voltage) of the push-pull transistor. Accordingly, a timepoint in which the seventh transistor T7G is turned on may be substantially the same as a timepoint in which the eighth transistor T8G is turned on. Accordingly, an emission characteristic of the pixel circuit PXG may be further improved.

Figure 17:
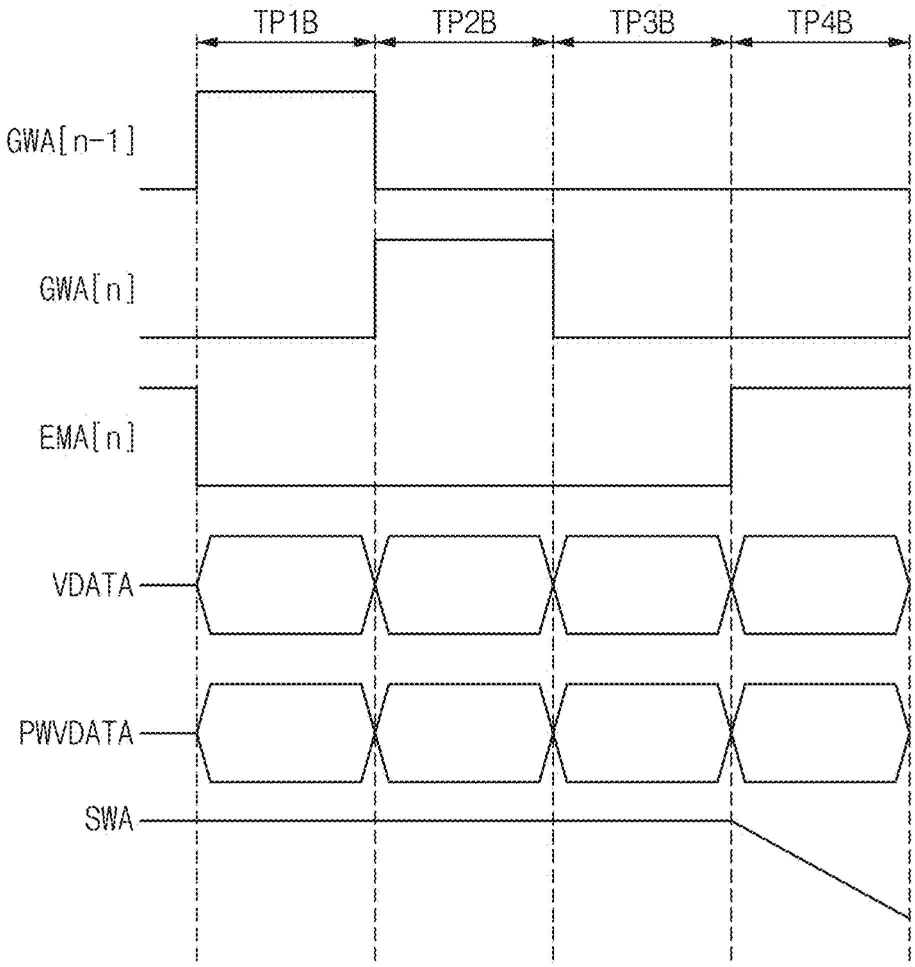
FIG. 17 is a timing diagram illustrating signals applied to a pixel circuit of FIG. 16.

FIG. 17 is a timing diagram illustrating signals applied to a pixel circuit PXH of FIG. 16.

Referring to FIG. 17, a timing diagram according to the present embodiment is substantially the same as a timing diagram of FIG. 14 except that an activation level of the emission signal EMA[n] may be a logic high level and an inactivation level of the emission signal EMA[n] may be a logic low level, such that the same reference numerals will be used and any repetitive explanation concerning the above elements will be omitted.

Figure 18:
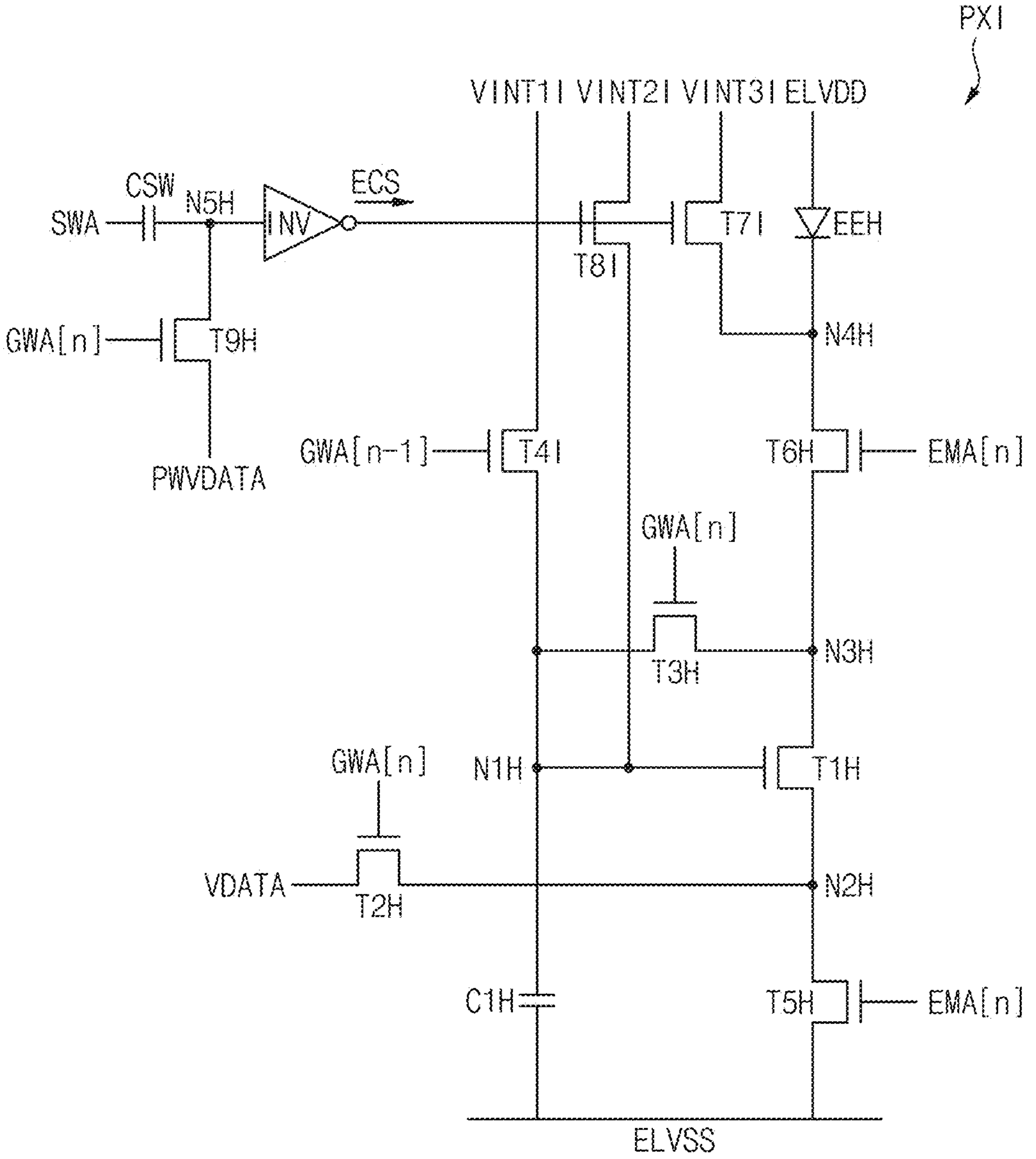
FIG. 18 is a circuit diagram illustrating an example of a pixel circuit included in a display panel of FIG. 1.

FIG. 18 is a circuit diagram illustrating an example of a pixel circuit PX included in a display panel 100 of FIG. 1.

Referring to FIG. 18, a pixel circuit PXI may include first to ninth transistors T1H, T2H, T3H, T4I, T5H, T6H, T7I, T8I and T9H, a first capacitor C1H, a sweep capacitor CSW, the inverting block INV and the light emitting element EEH.

The pixel circuit PXI according to present embodiment is substantially the same as the pixel circuit PXH of FIG. 16 except that a first initialization voltage VINT1I is applied to a first electrode of the fourth transistor T4I, a second initialization voltage VINT2I is applied to a first electrode of the eighth transistor T8I and a third initialization voltage VINT3I is applied to a first electrode of the seventh transistor T7I such that the same reference numerals will be used and any repetitive explanation concerning the above elements will be omitted.

Referring to FIG. 1, FIG. 17 and FIG. 18, the fourth transistor T4I may include a control electrode receiving the previous write gate signal GWA[n−1], a first electrode receiving the first initialization voltage VINT1I, and a second electrode connected to the first node N1H. The fourth transistor T4I may apply the first initialization voltage VINT1I to the first node N1H in response to the previous write gate signal GWA[n−1].

The seventh transistor T7I may include a control electrode receiving emission control signal ECS, a first electrode receiving the third initialization voltage VINT3I, and a second electrode connected to the fourth node N4H. The seventh transistor T7I may apply the third initialization voltage VINT3I to the fourth node N4H in response to the emission control signal ECS. For example, the third initialization voltage VINT3I may be higher than the first power voltage ELVDD. The third initialization voltage VINT3I may be higher than the first power voltage ELVDD, such that a black characteristic of the pixel circuit PXI may be further improved.

The eighth transistor T8I may include a control electrode receiving emission control signal ECS, a first electrode receiving the second initialization voltage VINT2I, and a second electrode connected to the first node NIH. The eighth transistor T8I may apply the second initialization voltage VINT2I to the first node NIH in response to the emission control signal ECS.

In the present embodiment, the first to ninth transistors T1H, T2H, T3H, T4I, T5H, T6H, T7I, T8I and T9H may be N-type transistors.

In the present embodiment, the emission control transistor may be turned off in response to the emission control signal ECS. In some aspects, the push-pull transistor may be turned on in response to the emission control signal ECS. Accordingly, the light emitting element initialization operation may be performed at each pixel circuit PXI. For example, a turned off timing of each driving transistor included in the pixel circuits PXI may be synchronized to a turned on timing of each push-pull transistor included in the pixel circuits PXI. Accordingly, an emitting characteristic of the pixel circuit PXI may be improved. In some aspects, the display apparatus 1 may be implemented without a driver generating a light emitting element initialization gate signal. Accordingly, an integration of the display apparatus 1 may be improved.

In the present embodiment, the pixel circuit PXI may include the inverting block INV. The inverting block INV may output the emission control signal ECS based on the voltage of the fifth node N5H. For example, the emission control signal ECS may have a logic high level or a logic low level. For example, even when the voltage of the fifth node N5H is changed linearly, the emission control signal ECS may have a logic high level or a logic low level. Accordingly, the emission control transistor and the push-pull transistor may be effectively controlled.

In an embodiment, a threshold voltage (e.g., an absolute value of threshold voltage) of the emission control transistor may be substantially the same as a threshold voltage (e.g., an absolute value of threshold voltage) of the push-pull transistor. Accordingly, a timepoint in which the seventh transistor T7I is turned on may be substantially the same as a timepoint in which the eighth transistor T8I is turned on. Accordingly, an emission characteristic of the pixel circuit PXI may be further improved.

Figure 19:
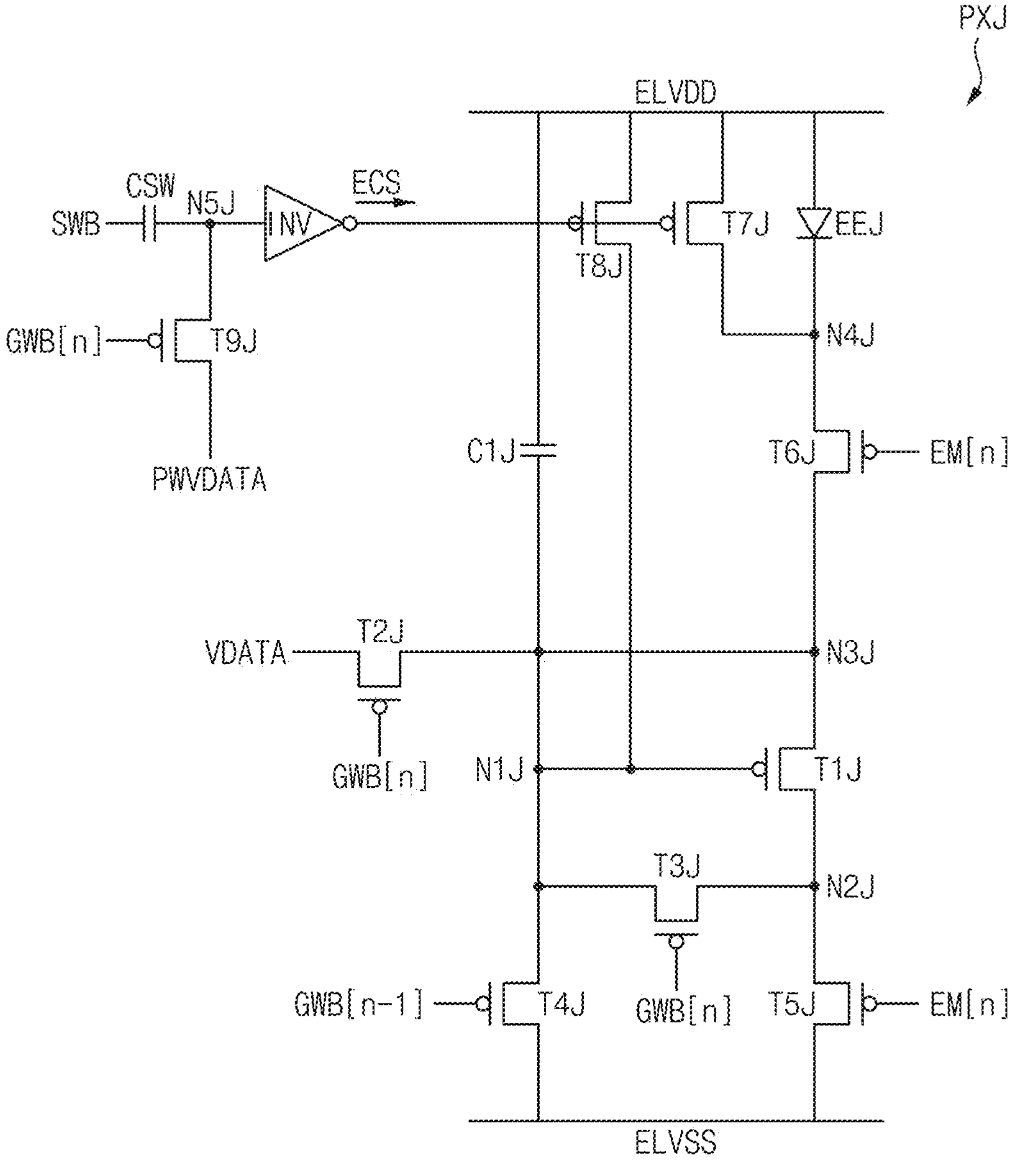
FIG. 19 is a circuit diagram illustrating an example of a pixel circuit included in a display panel of FIG. 1.

FIG. 19 is a circuit diagram illustrating an example of a pixel circuit PX included in a display panel 100 of FIG. 1.

Referring to FIG. 19, a pixel circuit PXJ may include first to ninth transistors T1J, T2J, T3J, T4J, T5J, T6J, T7J, T8J and T9J, a first capacitor C1J, a sweep capacitor CSW, the inverting block INV and the light emitting element EEJ.

The pixel circuit PXJ according to present embodiment is substantially the same as the pixel circuit PXH of FIG. 16 except that the first to ninth transistors T1J, T2J, T3J, T4J, T5J, T6J, T7J, T8J and T9J are P-type transistors, and the first power voltage ELVDD is applied to a first electrode of the eight transistor T8J and the first power voltage ELVDD is applied to a first electrode of the first capacitor C1J, such that the same reference numerals will be used and any repetitive explanation concerning the above elements will be omitted.

Figure 20:
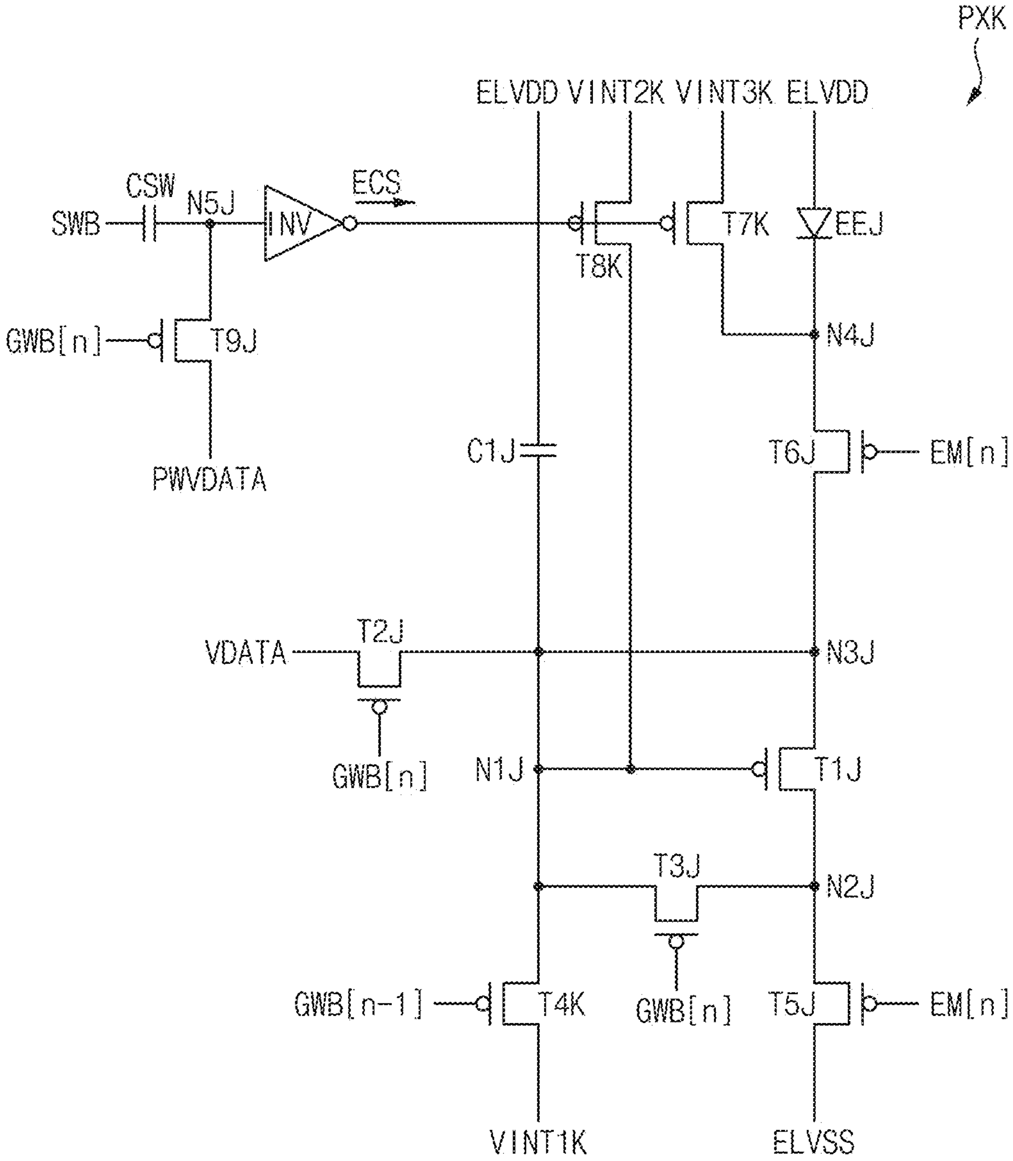
FIG. 20 is a circuit diagram illustrating an example of a pixel circuit included in a display panel of FIG. 1.

FIG. 20 is a circuit diagram illustrating an example of a pixel circuit PX included in a display panel 100 of FIG. 1.

Referring to FIG. 20, a pixel circuit PXK may include first to ninth transistors T1J, T2J, T3J, T4K, T5J, T6J, T7K, T8K and T9J, a first capacitor C1J, a sweep capacitor CSW, the inverting block INV and the light emitting element EEJ.

The pixel circuit PXK according to present embodiment is substantially the same as the pixel circuit PXJ of FIG. 19 except that a first initialization voltage VINT1K is applied to a first electrode of the fourth transistor T4K, a second initialization voltage VINT2K is applied to a first electrode of the eighth transistor T8K and a third initialization voltage VINT3K is applied to a first electrode of the seventh transistor T7K such that the same reference numerals will be used and any repetitive explanation concerning the above elements will be omitted.

Figure 21:
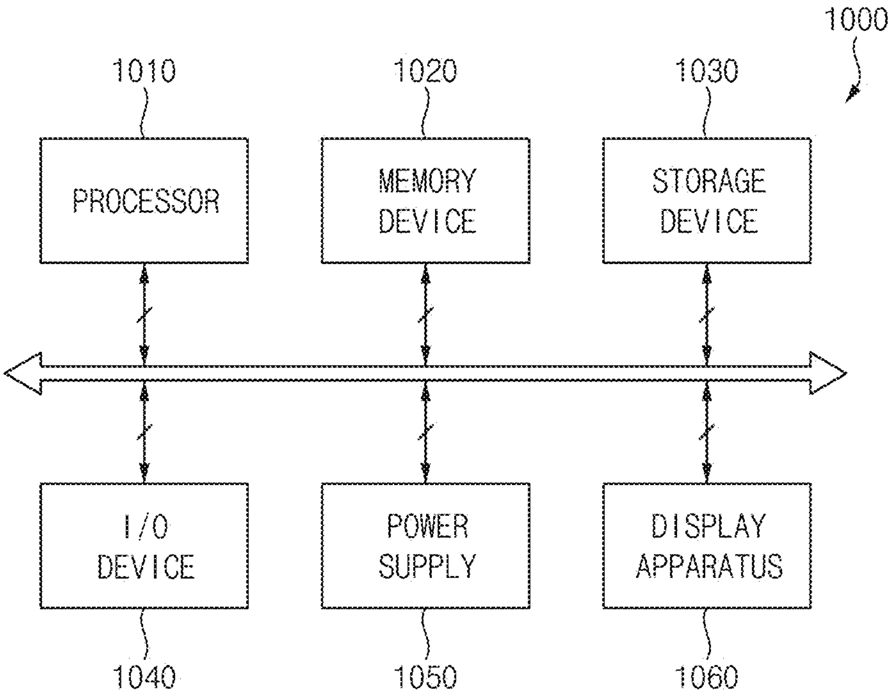
FIG. 21 is a block diagram illustrating an electronic apparatus according to an embodiment of the present disclosure.
Figure 22:
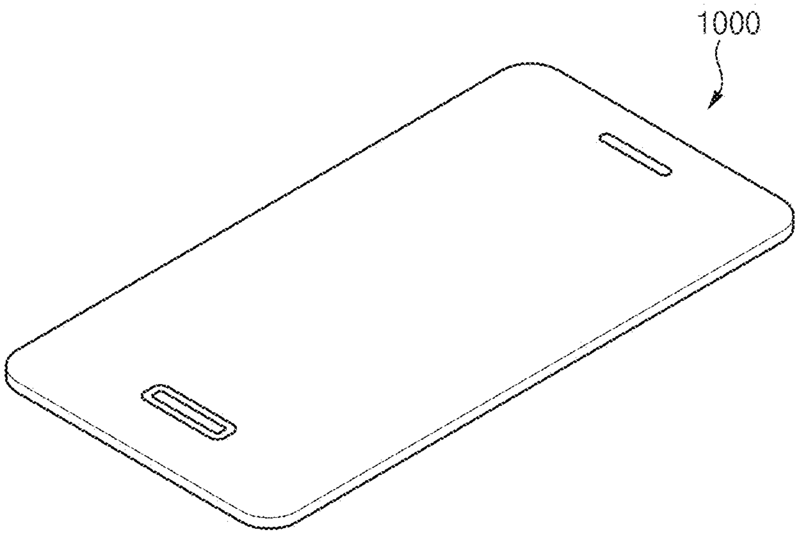
FIG. 22 is a diagram illustrating an example in which the electronic apparatus of FIG. 21 is implemented as a smart phone.

FIG. 21 is a block diagram illustrating an electronic apparatus 1000 according to an embodiment of the present disclosure. FIG. 22 is a diagram illustrating an example in which the electronic apparatus of FIG. 21 is implemented as a smart phone.

Referring to FIG. 21, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In some aspects, the electronic apparatus 1000 may further include a plurality of ports for communicating with a video card, a sound card, a memory card, a universal serial bus (USB) device, another electronic apparatus, or the like.

In an embodiment, as illustrated in FIG. 22, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, or the like. Further, the processor 1010 may be coupled to an extended bus such as, for example, a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic apparatus 1000. For example, the memory device 1020 may include at least one non-volatile memory device such as, for example, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as, for example, a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as, for example, a keyboard, a keypad, a mouse device, a touch-pad, a touch-screen, and the like and an output device such as, for example, a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Referring to FIG. 22, the electronic apparatus of the embodiments of the present disclosure is illustrated implemented as a smartphone, but embodiments of the present disclosure are not limited thereto. The electronic apparatus may be a television, a monitor, a laptop computer, or a tablet. In some aspects, the electronic apparatus may be a car.

The display apparatus according to the embodiments may be applied to a display apparatus included in a computer, a notebook, a mobile phone, a smart phone, a smart pad, a PMP, a PDA, an MP3 player, or the like.

The foregoing is illustrative of the embodiments of the present disclosure and is not to be construed as limiting thereof. Although example embodiments of the present disclosure have been described, those skilled in the art will readily appreciate that many modifications are possible in the embodiments without materially departing from the novel teachings and advantages of the embodiments of the present disclosure. Accordingly, all such modifications are intended to be included within the scope of the embodiments of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the embodiments of the present disclosure and is not to be construed as limited to the specific embodiments disclosed, and that modifications to the disclosed embodiments, as well as other embodiments, are intended to be included within the scope of the appended claims. Embodiments supported by the present disclosure may be defined by the following claims, with equivalents of the claims to be included therein.

What is claimed is:

1. A pixel circuit comprising:

a driving transistor which generates a driving current based on a data signal;

a light emitting element which emits light based on the driving current;

a pulse signal applying block which outputs an emission control signal based on a pulse data voltage and a timing signal; and a push-pull transistor which applies an initialization voltage to a first electrode of the light emitting element in response to the emission control signal, wherein the light emitting element stops emitting based on the emission control signal.

2. The pixel circuit of claim 1, wherein the push-pull transistor comprises a control electrode receiving the emission control signal, a first electrode receiving the initialization voltage, and a second electrode connected to the first electrode of the light emitting element.

3. The pixel circuit of claim 1, further comprising an emission control transistor which applies the initialization voltage to a control electrode of the driving transistor.

4. The pixel circuit of claim 3, wherein an absolute value of a threshold voltage of the push-pull transistor is equal to an absolute value of a threshold voltage of the emission control transistor.

5. The pixel circuit of claim 2, further comprising an emission transistor which outputs the driving current to the first electrode of the light emitting element.

6. The pixel circuit of claim 5, wherein an absolute value of a threshold voltage of the push-pull transistor is equal to an absolute value of a threshold voltage of the emission transistor.

7. The pixel circuit of claim 1, wherein the pulse signal applying block comprises:

a pulse writing transistor which applies the pulse data voltage to a pulse control node in response to a write gate signal; and an inverting block which outputs the emission control signal based on a voltage of the pulse control node.

8. The pixel circuit of claim 7, wherein the inverting block comprises:

a first inverter transistor comprising a control electrode connected to the pulse control node, a first electrode receiving a first power voltage, and a second electrode connected to an output node; and a second inverter transistor comprising a control electrode connected to the pulse control node, a first electrode receiving a second power voltage, and a second electrode connected to the output node.

9. The pixel circuit of claim 8, wherein the second power voltage is applied to a second electrode of the light emitting element.

10. The pixel circuit of claim 8, further comprising an emission transistor comprising a control electrode connected to the output node, a first electrode connected to the driving transistor, and a second electrode connected to the light emitting element, wherein:

the push-pull transistor comprises a control electrode connected to the output node, a first electrode receiving the initialization voltage, and a second electrode connected to the first electrode of the light emitting element, the emission transistor is a P-type transistor, and the push-pull transistor is an N-type transistor.

11. The pixel circuit of claim 1, wherein:

the driving transistor comprises a control electrode connected to a first node, a first electrode connected to a second node, and a third electrode connected to a third node, the pixel circuit comprises:

a writing transistor which applies a data voltage based on the data signal to the second node in response to a write gate signal;

a compensation transistor which connects the first node and the third node in response to the write gate signal;

an initialization transistor which applies the initialization voltage to the first node in response to a previous write gate signal; and an emission transistor which connects the third node and a fourth node in response to the emission control signal, the first electrode of the light emitting element is connected to the fourth node, and the push-pull transistor comprises a control electrode receiving the emission control signal, a first electrode receiving the initialization voltage, and a second electrode connected to the fourth node.

12. The pixel circuit of claim 11, wherein:

the timing signal is a sweep signal, a frame period in which the pixel circuit is driven comprises a writing period and an emission period, in the writing period, the write gate signal has an activation level, and the writing transistor is turned on, and in the emission period, the sweep signal is gradually decreased from a high level to a low level.

13. The pixel circuit of claim 11, wherein the emission transistor is a P-type transistor, and the push-pull transistor is an N-type transistor.

14. The pixel circuit of claim 1, wherein:

the driving transistor comprises a control electrode connected to a first node, a first electrode connected to a second node, and a second electrode connected to a third node, the pixel circuit comprises:

a writing transistor which applies a data voltage based on the data signal to the second node in response to a write gate signal;

a compensation transistor which connects the first node and the third node in response to the write gate signal;

an initialization transistor which applies the initialization voltage to the first node in response to a previous write gate signal;

a first emission transistor which applies a first power voltage to the second node in response to an emission signal;

a second emission transistor which connects the third node and a fourth node in response to the emission signal; and an emission control transistor which applies the first power voltage to the first node in response to the emission control signal, the first electrode of the light emitting element is connected to the fourth node, and the push-pull transistor comprises a control electrode receiving the emission control signal, a first electrode receiving the initialization voltage, and a second electrode connected to the fourth node.

15. A display apparatus comprising:

a display panel comprising a pixel circuit;

a gate driver which outputs a gate signal to the display panel;

a data driver which applies a data voltage and a pulse data voltage to the display panel based on a data signal;

a driving controller which outputs the data signal to the data driver; and a sweep signal generator which outputs a timing signal to the display panel, wherein the pixel circuit comprises:

a driving transistor which generates a driving current based on the data signal;

a light emitting element which emits light based on the driving current;

a pulse signal applying block which outputs an emission control signal based on the pulse data voltage and the timing signal; and a push-pull transistor which applies an initialization voltage to a first electrode of the light emitting element in response to the emission control signal, wherein the light emitting element stops emitting based on the emission control signal.

16. The display apparatus of claim 15, wherein the push-pull transistor comprises a control electrode receiving the emission control signal, a first electrode receiving the initialization voltage, and a second electrode connected to the first electrode of the light emitting element.

17. The display apparatus of claim 16, wherein the pixel circuit further comprises an emission control transistor which applies the initialization voltage to a control electrode of the driving transistor.

18. The display apparatus of claim 17, wherein an absolute value of a threshold voltage of the push-pull transistor is equal to an absolute value of a threshold voltage of the emission control transistor.

19. The display apparatus of claim 16, wherein the pixel circuit further comprises an emission transistor which outputs the driving current to the first electrode of the light emitting element.

20. An electronic apparatus comprising:

a display panel comprising a pixel circuit;

a gate driver which outputs a gate signal to the display panel;

a data driver which applies a data voltage and a pulse data voltage to the display panel based on a data signal;

a driving controller which controls the gate driver and the data driver and outputs the data signal to the data driver, based on an input control signal;

a processor which outputs the input control signal; and a sweep signal generator which outputs a timing signal to the display panel, wherein the pixel circuit comprises:

a driving transistor which generates a driving current based on the data signal;

a light emitting element which emits light based on the driving current;

a pulse signal applying block which outputs an emission control signal based on the pulse data voltage and the timing signal; and a push-pull transistor which applies an initialization voltage to a first electrode of the light emitting element in response to the emission control signal, wherein the light emitting element stops emitting based on the emission control signal.

* * * * *